(12) United States Patent  (10) Patent No.: US 8,424,772 B1
Whitaker  (45) Date of Patent: *Apr. 23, 2013

(54) TRANSACTIONAL CARD, SYSTEM, AND METHOD

(76) Inventor: Michael L. Whitaker, Arlington Heights, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/135,670

(22) Filed: Jul. 12, 2011

Related U.S. Application Data

(63) Continuation of application No. 12/229,542, filed on Aug. 25, 2008, now Pat. No. 8,002,197, which is a continuation of application No. 11/491,040, filed on Jul. 21, 2006, now abandoned, which is a continuation-in-part of application No. 11/133,692, filed on May 20, 2005, now abandoned, which is a continuation-in-part of application No. 10/963,943, filed on Oct. 13, 2004, now abandoned.

(60) Provisional application No. 60/510,889, filed on Oct. 14, 2003.

(51) Int. Cl.
*G06K 19/06* (2006.01)
*G06K 19/02* (2006.01)

(52) U.S. Cl.
USPC ........... 235/493; 235/375; 235/380; 235/449; 235/487; 235/488

(58) Field of Classification Search .................. 235/375, 235/380, 449, 451, 492, 487, 493
See application file for complete search history.

(56) References Cited

U.S. PATENT DOCUMENTS

| | | | | | |
|---|---|---|---|---|---|
| 5,495,981 | A | * | 3/1996 | Warther | 229/71 |
| 5,501,491 | A | * | 3/1996 | Thompson | 283/70 |
| 6,161,870 | A | * | 12/2000 | Blank | 283/75 |
| RE41,925 | E | * | 11/2010 | Warther | 283/61 |
| 2002/0185529 | A1 | * | 12/2002 | Cooper et al. | 235/380 |
| 2003/0028439 | A1 | * | 2/2003 | Cox et al. | 705/26 |
| 2003/0029557 | A1 | * | 2/2003 | Hwang | 156/252 |
| 2003/0234286 | A1 | * | 12/2003 | Labrec et al. | 235/380 |
| 2004/0091659 | A1 | * | 5/2004 | Banks et al. | 428/41.8 |
| 2004/0155104 | A1 | * | 8/2004 | Mitchell, Jr. | 235/380 |
| 2007/0057040 | A1 | * | 3/2007 | Blank et al. | 235/380 |

* cited by examiner

*Primary Examiner* — Tuyen K Vo
(74) *Attorney, Agent, or Firm* — Martin G. Ozinga; Phillips Murrah PC

(57) ABSTRACT

A transactional card system comprising a carrier having at least one removable die cut card having a unique identifier and wherein the at least one card is removably attached to the carrier and further including at least one removable die cut data component removably attached to the carrier.

4 Claims, 14 Drawing Sheets

FIG. 4
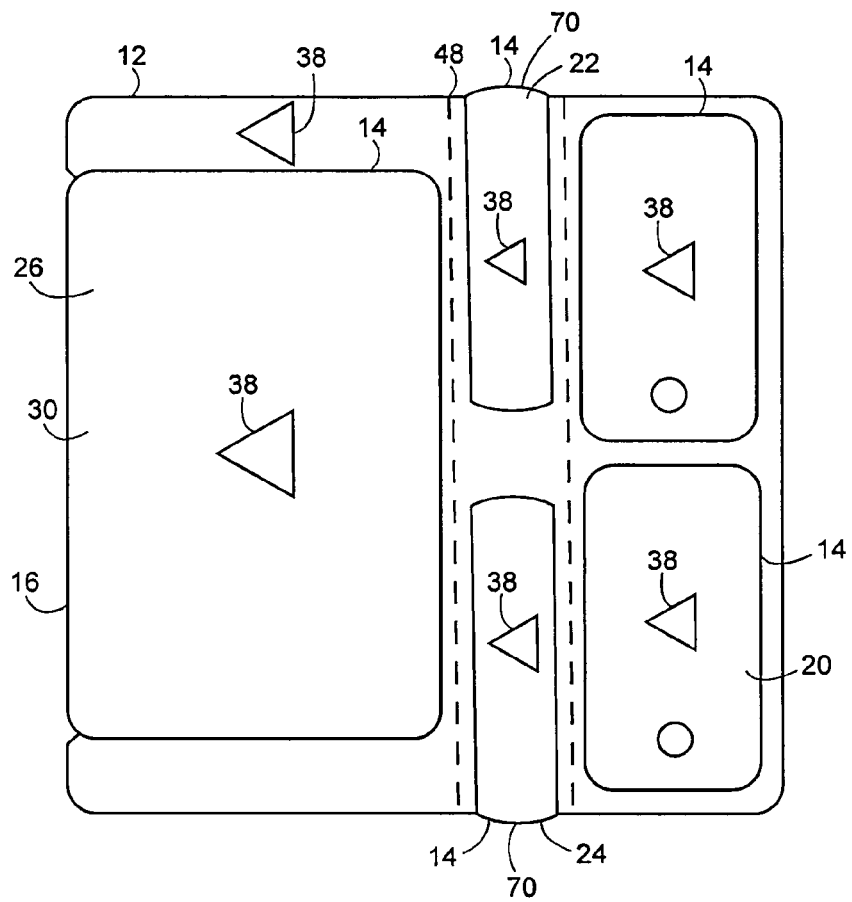
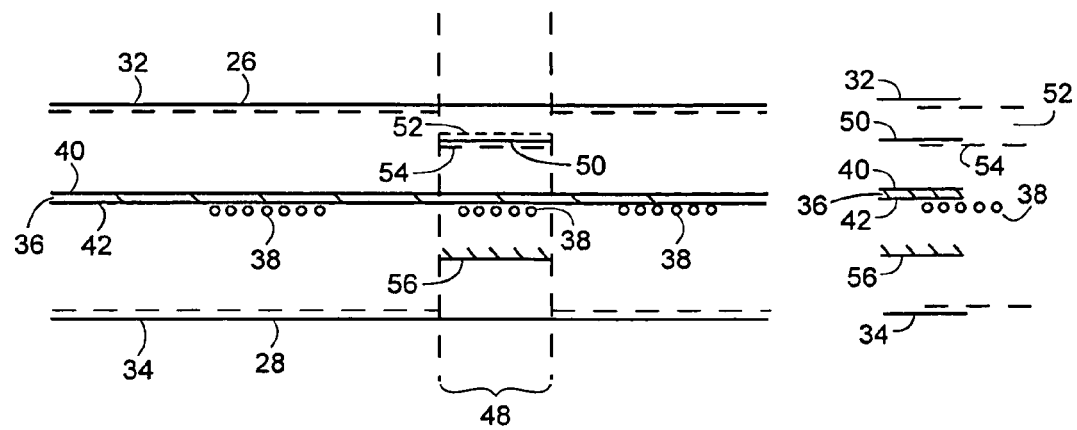
FIG. 5

TRANSACTIONAL CARD, SYSTEM, AND METHOD

CROSS-REFERENCE TO RELATED APPLICATIONS

The present application is a continuation of U.S. Ser. No. 12/229,542 filed Aug. 25, 2008, now U.S. Pat. No. 8,002,197 which is a continuation of U.S. Ser. No. 11/491,040, filed on Jul. 21, 2006, now abandoned, which is a continuation-in-part of U.S. Ser. No. 11/133,692, filed May 20, 2005, now abandoned, which is a continuation-in-part of U.S. Ser. No. 10/963,943, filed Oct. 13, 2004, now abandoned, which claims priority to U.S. Provisional Ser. No. 60/510,889, filed Oct. 14, 2003. Each of the applications listed above is hereby expressly incorporated herein by reference in their entirety.

BACKGROUND OF THE INVENTION

1. Field of the Invention

In general, the present invention relates to uniquely identifiable transaction card systems. More particularly, the present invention relates to a new and improved transactional card component and identity transfer, system and method for making.

2. Description of the Prior Art

There is a substantial market for inexpensively manufactured, individually identified, transaction cards for such uses as store credit cards, gift cards, membership cards, I.D. cards, and the like. These transaction cards typically include information/data which has been applied to the card with unique characteristics. Often this encoding is done through bar codes that are used in conjunction with an optical scanner, magnetic stripes used in conjunction with a magnetic/electric scanner, and often combinations of both. These formats permit automatic machine scanning of the card for identification, transactions and so forth. Typically, these cards are supplied in sets with one or more removable elements, such as fobs, tokens, tags, and the like being supplied with each card and bearing the same individual unique identifying information, like code numbers, as the card for attachment to key rings, previously existing cards, application forms, membership lists, and such.

Typically, a card is a paper or plastic printed product that contains information that is affiliated with a user-specific program, group or promotion. Cards may contain unique data (applicable to that specific card), generic data (applicable to a group), customized printed graphics, associated technologies (bar code, magnetic stripe, signature panel, SIMM chip, SMART chip, microprinting). A card can be any size, but is generally in the industry described as credit-card sized, 2.125 inch by 3.375 inch object. Of note, a card may also be a reference to or be described by the term "key tag" or "key fob". Likewise, any other size of usable planer product that can be removed from a component matrix of like materials may also generally be referred to as a "card", "element" or "component".

The terms, "matrix", "carrier", or "card assembly", are a reference to the means to hold the component parts together throughout the manufacturing process and deliver the component parts to the end-user in one combined piece. Generally, these are made of a material that eventually is transformed into the component parts associated with transactional card systems where the multiple removable components may carry a unique identifiable information or code that is common among all elements. All components share this common information for the purpose of providing the card issuer or card user with various options for the manner in which the matrix unit is issued and subsequently used in transactions thereafter. A "card unit" or "matrix unit" or "card assembly" is generally a reference to a combination of component parts within a surrounding matrix made of the same material. The matrix is often the card material that surrounds the usable product on some or all sides of the products. Usable product are the pieces that will punch out to be consumed and/or saved and used by the consumer such as but not limited to key tags, cards, and other usable items including additional reference elements.

A magnetic stripe is generally a reference to a narrow band of metallized tape that can receive and store magnetic energy in one, two and/or three tracks of information. Encoding is a general reference to the placement of variable data on magnetic media via magnetic energy.

Furthermore, activation is a general reference to the systematic authorization of a card as it is first distributed for use, usually via activation swipe through a point-of-sale terminal or barcode scan, transmitted to the parent data control system that verifies and authorizes subsequent card activity. The term data is a general reference to any type of affiliated data that specifically relates to a matrix unit's contents, such as account number, bar code, serial number, SKU, PIN, or other identifiable data.

Cards within a like-material matrix are offered for a variety of commercial uses, such as phone cards, gift cards, membership cards, voucher cards, display cards, coupon cards, frequent shopper cards, loyalty cards, and other uses. These card-based products are often issued and possibly activated at the retail setting prior to issuance to the consumer via an activation swipe or barcode scan or manual data entry. The typical matrix concept, sometimes known as a co-planer carrier, generally utilizes the traditional credit card size operation that is common in the plastic and paper card/voucher industry, such as gift cards, phone cards, loyalty cards, frequent shopper cards, membership cards, ID cards, and access cards.

The term "card component transfer" refers to the market's increasing need for various pieces, or components, of a whole unit, to be transferable to a secondary use. Prior art has attempted to affix an adhesive strip to the outside of various components for use later. What is needed is a more creative and durable products especially when unique data is involved.

The term "card identity transfer" refers to the industry's need to register a specific, unique identifying code or number to the end-user of the card unit at the time the card unit is issued to the end-user. When transferring ownership or possession of the card unit from the card issuer to the card unit's end-user, the industry requires that the end-user be linked to that card unit's future transactions such as retail purchases, visits, participation levels, and responses to marketing efforts. At the time of card issuance, it is critical to register the card unit's unique identifying code or number to the end-user's related demographic and personal information such as name, address, household demographic information and so forth. If a card unit is first issued to the end-user without subsequent linkage and registration, the end-user's future transactional data, shopping habits, visit frequency, and so forth is not useful to the card issuer and the card unit is thereafter "orphaned" within a registry database.

Registration of an end-user's personal or demographic information is commonly performed via an application form in which the end-user writes or types their unique information. These forms are typically paper fill in sheets or even electronic fill in screens. This application form is then added to a customer database via scanning, manual data entry, or digital photography. Important to the linkage of the end-user to the card unit is the ability to transfer the card unit's unique identifying information to the end-user's application prior to transferring ownership and possession of the card unit from the issuer to the end-user.

Application forms are commonly a printed form with either a glossy or fibrous paper or plastic surface, like many traditional enrollment forms. When transferring an identity component from the card unit to an application form, a means of adhering/affixing the identity component to the application form is required.

In the prior art, some card manufacturers have created card matrix combinations that end results in a card and two key tags, a card and one key tag, two cards only, two cards and two key tags, etc. Furthermore, it is known to produce a matrix with a hang hole in the upper portion for use as a structural display carrier with the usable component parts detachable upon purchase and possible activation either before or after components have been attached. To these and other possible constructions, in the prior art, an identity component is incorporated somewhere on or around the card unit.

In the prior art, relating to how card units may be constructed, manufacturers commonly achieve a finished card product in the using a white opaque or transparent printing sheet, "substrate" is printed via standard printing technology such as litho, offset, web, gravure, digital or other static printing process (i.e. inks are applied uniformly to the substrate and print the same base artwork with each printing revolution of the printing press). Such printing is commonly performed on front and back with the customer's desired artwork. Artwork on the card unit front may consist of a logo, marketing campaign, graphics, text, and other features that make the card unit front a presentable product to their end-user. Artwork on the card unit back often contains instructions for use, terms and conditions, security features, and any other administrative or systemic marking or information that is helpful to the customer's card program. Cards are sometimes manufactured with no artwork printed via standard methods on one or both sides and are considered in embodiments below.

Although card units can be cut from substrate following printing standard printing processes, the card industry for 40 years has applied a protective plastic layer on each side of the substrate to preserve the quality of the printing and add a stiffness to the card unit body. Plastic layers, adhered to the substrate on one or both sides via a laminating process can be made of PVC, polyester, polypropylene, and other finished plastics. This layer of plastic varies in thickness and durability by the choice of the manufacturer and his customers based upon economic, security and product durability considerations.

The card industry is specialized in its ability to also apply data to card units per the intended use of the customer and his end-user. Such data can include variable data including names, addresses, serial numbers, control numbers, bar codes, reference codes and text, and other data elements that reflect the particular card unique among all others. It may also include fixed data such as program codes, batch and lot numbers, category markings, card retail value, and other data elements that are common among a group of cards, and any other type of information. Such data is applied to the card unit in three general approaches.

The first being through direct data printing upon the substrate before it receives a laminated protective layer—where the master substrate sheet may contain one or more card units printed with data on a per-sheet basis. The second may be through direct data printing upon the substrate where no laminated protective layer will ever be applied (such as a limited use card) where the data can be applied either to a master substrate sheet containing more than one card. A third may be through direct data printing after the card has been separated from the master substrate sheet, either laminated or unlaminated, and is a finished card product.

In the prior art approaches above for data imaging, for card manufacturers who serve customers requiring a more durable card product, the data is often printed on the master substrate sheet prior to lamination in an effort to maximize the durability of the data during the card's useful life. Therefore, a sheet-based imaging device applies data across a sheet containing one or more cards. During this process, variable and fixed data, sourced from a computer data file, are formatted via computer software to print on the sheet-based imaging device on a page-by-page basis. During this data printing process, the manufacturer can print any number of data images. For the card industry, data can be printed in position to fit within a card, keytag, fob, token, and any other space on the substrate that may eventually become a card component.

The manufacturer can control the relationship of this data across all card unit components and choose that all components reflect a common identity for that specific card unit. It is the ability to accurately and easily transfer the card unit's unique identity via detachment from the card unit to other linked uses such as customer application forms, existing cards in a customer's possession, calendars, and so forth where the industry is particular lacking.

In the prior art, manufacturers have met the needs of customers who wanted a detachable identity component via one of two methods. The first approach or hereinafter referred to as "Prior Method 1" involves applying a matching identity component after the card unit has been manufactured or finished. Typically, a finished card unit has been printed, imaged with necessary variable or fixed data for all needed components, laminated and die cut to form. In Prior Method 1, the identity component is made of different materials than the card unit. Common materials are thin plastics or paper, opaque white, with an adhesive on the underside of the thin plastic or paper. An Avery label is an example of this construction.

The post-production process in this prior art involves numerous steps and not necessarily in this order: passing the card unit under a scanner or camera; the scanner or camera reading the unique identifier and sending that information to a processing device (i.e. hardware and software); possibly performing a data table search for that specific data record; sending a signal to a label applicator device and applying an adhesive-backed label to the card unit (either before or after printing the label); sending a print signal to a printing device; printing device prints an image upon the adhesive-backed label that provides adequate reference/linkage to the card unit (e.g. bar code, account code, reference number), printing either before or after the adhesive-backed label is applied to the card unit; issuance of the card to end-user; at issuance, the removable label is applied to a secondary data use.

This prior art method has existed in the industry since the mid-1990s. The drawbacks of this prior art approach of Prior Method 1 to the identity component's design, printing and application are numerous, and can be separated into three general categories of quality, cost and "design for use". Quality drawbacks to Prior Method 1 stem from the increased number of variables introduced into the final manufactured product. The following industry-wide considerations have been known to affect product quality.

In order for a identity component to be attached to the surface of the card unit, the card unit must be transported by a feeding and conveyor system so that it passes under a scanning apparatus and possibly the printing apparatus as the label is applied (the card unit would not have to pass under a printing apparatus if the label is printed just prior to being affixed to the card unit). Most often, the label must be affixed to the back side of the card unit where the other identical reference data is also located. Thus, the front side of the card unit usually displays the card issuer's artwork, logos, special colors, and unique designs. In this feed and transport process, the card's front surface is often scratched or scuffed as it is passed through the feeding mechanism and across conveyor chain or belt. In addition, the transport mechanism carries dirt, dust and possibly ink residue which can attach itself to the front of the card unit's surface, spoiling the clarity and quality of the most important artwork.

An additional quality issue arises when the label application equipment applies the label in an incorrect location due to label applicator error, sensor errors, card unit surface changes, or label material defects. When a label is applied incorrectly, it may be crooked (not parallel with the card unit's edges), it may be out of position and extending beyond the specified location on the card unit, or it may not be applied at all (skipped). In any similar instance, the card unit must be reworked by pulling off the misapplied label and possibly leaving adhesive residue and then re-run through the transport process. Some manufacturers simply re-label the card unit with another label on top of the misapplied label thereby when the card issuer attempts to pull off the appropriate label, both labels may become detached and complicate the application registry process.

When using a secondary scanning, printing and labeling process, the industry also experiences a matching error due to hardware and software errors in the label printing timing. When this error occurs, the printed label that is applied to the card unit does not match or relate to that specific card unit—and thus, it is labeled wrong and in the application entry process, the end-user is linked to the wrong card unit and the database registry for the card issuer is contaminated with faulty data. This situation is the highest risk and most serious consequences for the manufacturer and his card-issuing customer. Any secondary data printing process that occurs at a different stage of manufacturing of the card unit's other data components is subject to the errors of the transport, scanning, labeling and printing hardware and software. When human labor is added to this process, the risk of a identity component in label form not matching the card unit upon which it is applied is significant and very detrimental to the card manufacture and or card issuer relationship. In the card industry, manufactures have lost customers due to this mismatch problem. The fact is that no collection of scanning and printing software combined with human labor can overcome this potential serious problem and assure no mismatched label components have been applied to a card unit order. For example, in a card unit order of one million card units, if this error only occurs 0.001% of the time (a thousandth of a percent), at least 10 end-users will be registered into the issuer's database with the wrong card number.

An additional quality problem arises from the label stock used by the card manufacturer. Traditionally, such labels and their underlying liner are ordered in large spools and the labels are pre-cut for length, width and space between labels. Manufacturers of such labels, whether paper or plastic, have their own inconsistencies which affect the success of the labeling process, including: over-cutting labels where the label web is weakened and breaks in the label applicator's winding mechanism; uneven adhesive application to the back side of the label which changes label thickness or the absence of adequate adhesive makes the label not apply securely to the card unit; and inconsistencies in liner strength sometimes cause liner failure where the labeler winding mechanism breaks the weakened liner. In addition, label manufacturers have common variation in the label's position on its liner, varying as much as ⅛" up or down in its linear position. This could mean a misplacement of up to ⅛" too high on the card unit or ⅛" too low on the card unit.

When any labeling error occurs where the label is out of position during its printing phase, the risk of misplaced printing with the unique identifier data or code is great. If the label stock is moving as it is unwound and placed under the printing mechanism, the print will be off-center where the important identity component's contents are shifted out of alignment, hanging off the label's edge, crooked or skewed printing, printing that is cut off and incomplete, etc. In cases where the desired information is printed incomplete, unreadable, cannot be scanned, or skewed, the end-user and card-issuer will simultaneously recognize the poor visual quality of the card unit's label presentation as the card issuer presents the card to the end-user. The card-issuer exchanges the card unit for the end-users personal application form, for example, and each party is able to see that the label is misprinted and of poor quality. In addition, if the label printing cannot be read or scanned correctly, the subsequent application data entry will be error prone and very likely result in this end-user's data not being linked to the card unit they were issued because application data entry processes cannot "guess" at what data has been cut off or is missing or illegible on the label. The application data industry currently struggles with unusable printed label data every day.

The quality of imaging of identifying label components is an inconsistent and troublesome issue for card customers. Common technologies used to print on labels in the process described above are either thermal transfer or inkjet. Thermal transfer processes use a thermal ribbon which releases the colored ink, like old typewriter disposable ribbon, when heated. Consequently, when these ribbons age, are exposed to varying temperatures, are used in older thermal printers, the consistency of the printing quality declines and leads to poor printing clarity and possible scanning problems for the data imaged. In addition, the thermal transfer process is considerably slower than the newer inkjet process. Thermal transfer systems require more frequent thermal ribbon change-overs, for example. Thermal transfer systems also require considerable more maintenance than inkjet systems. For inkjet applications, a much faster process requiring less maintenance, a liquid ink is either sprayed or rubbed onto the label surface as the label passes underneath the printing head. While thermal transfer can print at printing resolutions of up to 300 dots per inch (acceptable customer need for data clarity), inkjet processes cannot match such printing resolution. Inkjet systems in the card industry range from 128 dots per inch to approximately 250 dots per inch, depending on speed and increasing technology. Consequently, the quality of inkjet printed data is less dense if the manufacture desires to run the system at its maximum speed and gain efficiencies.

For printed bar codes, for example, some card manufacturer's inkjet printing systems print at a quality resolution that is less than the reading capability of the card-issuer's or application data entry's scanning equipment, causing problems in the registry of the end-user's identity with the card unit. For this reason, some card customers mandate a specific higher quality printing resolution on a data label component. In addition, inkjet systems must use either a water-based ink or a solvent-based ink or an ultra violet cured ink. Water based inks do not dry quickly and will smear when they touch other card units in the stacking process following labeling. Solvent based inks dry quickly but release methyl ethyl ketone fumes into the manufacturer's environment and such fumes are nauseous to factory workers and such ink waste must be handled by environmental control companies and destroyed at additional expense to the manufacturer. Ultra violet cured inks introduce three additional, very undesirable, environmental concerns to the factory environment: Potential exposure to intense UV light by factory workers (eyes and skin), exposure of skin to UV ink (irritant and carcinogen), and expensive containment and disposal requirements. All of the above issues with the two standard printing technologies create problems for the card customer and the card manufacture.

The cost drawbacks to Prior Method 1 stem from the increased processing and handling required by the manufacturer. The following industry-wide considerations have been known to affect product cost.

The application of a printed label to the card unit requires a secondary process. Many card manufacturers, after completing the card unit's manufacturing, must then feed and transport the product once again through the feed-transport-scan-print-label-stack process described above. This secondary processing has additional significant costs such as an additional production line is required with assets that may include a feeder, transport base, scanner, computer, printer, and labeler. These assets consume factory space, are expensive (approximately $100,000.00 USD or more) and each machine requires unique operator knowledge and maintenance adding overhead expense due to Prior Method 1. Additional factory workers are required to run this production line, at least two workers in most cases. This labor adds to the expense of Prior Method 1, costing from $0.003 to $0.005 USD per label printed and applied. Separate label and ink component raw materials are used in Prior Method 1, costing from $0.006 to $0.011 USD per label printed and applied.

A very significant issue is additional card unit waste. Prior Method 1 requires the secondary processing described above and each of the machine components has the ability to degrade or destroy the card unit. Consequently, the card manufacturer loses further revenue due to waste associated when cards are miss-labeled and must be reworked. When any labeling application error occurs on one card unit, it often affects all card units being transported along the conveyor transport also, possibly 10 to 20 card units. All of these must be manually checked for accuracy and/or collected and re-run through the process again. Card units that received labels but have incorrect data or no data at all must have the labels manually removed before re-running the cards. Needless to say this may be a very time consuming and labor intensive process.

The card manufacturer loses further revenue due to waste associated when such card units must be destroyed due to this secondary process when the card is no longer meeting quantitative or qualitative requirements. Most costly, and common in the industry, are card unit orders from customers which require all cards within a data range to be present. Thus, if the secondary processing described above destroys a card unit, the card manufacturer must start over the complete manufacturing process for that card unit, to include printing, data imaging, lamination and die cutting and re-labeling. Card unit waste costs under these circumstances are incredible in comparison to the revenue generated by the card unit itself.

Other known deficiencies in Prior Method 1 may include properties of the label or "design for use". Labels designed for application directly to the plastic surface of the card unit are commonly designed with pressure-sensitive, reusable adhesive. Once the label is applied to the card unit surface, is exposed to air, humidity, dust, heat/cold and friction. The consequences of such exposure have proven to limit the "shelf life" of manufactured card units. Proven by customer feedback and known properties of adhesives, especially pressure-sensitive adhesives, exposure to such elements shortens the life and durability of the adhesive properties. Finished card units, shipped to the customer, are not necessarily used within any known span of time. Cards may remain unused for months or even years, depending on the card issuer's intentions, purchasing strategies, business circumstances and other reasons. The card issuer may store the unused card units in environments that are not climate controlled. The card issuer (customer) may leave open the card unit box in which several hundred or thousand cards are stored, thereby exposing the product to the environment. Additionally, card units may be bounced, removed from their box, returned to their box, sorted, inventoried, repacked, dropped and receive various care during storage. All of the above circumstances can lower the value of the customer's investment because the product is becoming less usable due to the impact upon the exposed adhesive and liner properties. Certainly, any customer storing cards will be inventorying those card units as assets and assuming full asset value when the cards are distributed to points of issue.

Further, when a label carrying unstable adhesive properties is lifted from the card unit, consequences may result due to the changed adhesive properties. The label can tear or stretch because the adhesive did not easily release from the card units' surface. The card issuer must then paste or tape the disfigured label to the secondary use (e.g. customer application form) and the label's data contents may be then unreadable, as in a bar code my be torn or stretched and unrecognizable by a scanner.

The label can leave adhesive residue on the card unit's surface due to the effects of the environment on the adhesive and its advanced curing upon the plastic surface. This glue residue remains on the card unit, is noticeable to the untrained eye, and becomes extremely noticeable as it attracts dirt and skin oils, eventually appearing darker and unsightly on the product the more it is handled.

The general second prior art approach, hereinafter referred to as "Prior Method 2", involves imaging all card unit data, on the substrate sheet for each card's unique identifying data where among all other card unit components, one or more components are intended to further identify and link the card unit to a secondary intended use such as customer application forms, existing cards in a customer's possession, calendars, and so forth. In this method of data imaging, the card unit's identifying data has been printed at once, including data that may be used for all components that may be removed from the card unit and used elsewhere. Prior Method 2's approach may improve upon the quality and cost detriments of Prior Method 1 because a secondary data application process is unnecessary. Once data is imaged upon the substrate in Prior Method 2, the substrate sheet is laminated with two basic approaches to constructing any removable identifying element intended for card unit identity transfer.

Under this prior art, one approach is the substrate sheet is laminated where a portion of the substrate edge is left unlaminated on one or both sides of the substrate. For example, an 8 inch substrate sheet is laminated 7 inches across leaving 1 inch unlaminated. Another example would be for the same 8-inch substrate sheet to be laminated 6 inches across leaving 1 each on each side unlaminated. In either example, a card unit and all its possible components is cut as a whole from both the laminated area and the unlaminated area, presenting a finished card unit with a majority portion laminated and an unlaminated portion attached. It is in the unlaminated areas where additional data has been previously imaged that the manufacturer may die cut or perforate a shape surrounding the data whereby the card issuer can tear or break away this unlaminated portion of substrate and use that portion to transfer the card unit's identity to other uses. The remainder of the card unit, where laminated, consists of all other related components and may be issued to the end-user by the card issuer. However, some form of tape, staple, or other affixing device must be used to adhere the unlaminated portion of substrate to the related use to assure proper data linkage and end-user data registry as described above. Prior Method 2 also includes the placement of a common pressure-sensitive 3-layer adhesive tape to the surface of the unlaminated substrate opposite the identifying data. Such 3-layer adhesive tape consists of LINER+ADHESIVE+LINER construction.

During tape application, one layer of liner is removed as the remaining ADHESIVE+LINER is pressed against the card material's surface. Such tape carries a removable liner that extends beyond the underlying adhesive and is marked with such words as "REMOVE FOR USE. This type of tape is unrolled along the unlaminated portion of the entire substrate sheet, and is die cut with the rest of the card unit whereby the unlaminated substrate carrying the identifying data for transfer is cut to appropriate size for a removable component and the pressure-sensitive tape is cut to the same linear length. At the time of card issuance, the unlaminated removable component holding identifying data is removed from the card unit, the pressure-sensitive adhesive's liner is removed by the card issuer and the resulting component can be applied to any secondary use requiring identity transfer.

However, Prior Method 2 first approach has several deficiencies inherent to its art, including the appearance of the finished card unit, the process of construction and impact on quality of the card unit and the "design for use" of the removable components that have limited its success in the industry.

A typical deficiency in the Prior Art Method 2 is the appearance. Customer feedback in the industry describes the unlaminated portion of the card unit derived from this method as "floppy", easy to bend and wrinkle, easy to get dirty, and generally not as appealing due to the unevenness of the card unit's surface. Also significant are customer observations such as described below.

Typically, printed graphics appear differently when laminated whereby a color printed both on the laminated and unlaminated portions of the substrate appear different. Often, colors appear deeper and denser when laminated. The off-white and sometimes printed "REMOVE" liner that extends the entire length of the unlaminated card edge detracts from the card unit's appearance. The card's appearance from the front is most important from a marketing perspective per the discussion on front vs. back artwork above. This pressure-sensitive adhesive liner takes attention away from the card unit's printed graphics and does not fit in well with any common card unit design.

In order for the unlaminated substrate to remain flat and in place with the rest of the card unit during die cutting, small notches are ground into the cutting die throughout the circumference of the removable data component's shape with the intention of not cutting the substrate in several locations throughout the circumference. While this cutting modification assists in the data component's remaining in place, they are a detriment to appearance due to the fact that in order to remove the data component from the card unit, those small areas not cut in the data components circumference must tear away as the component is removed. These tears appear as burs or bumps or stretched substrate fibers in both the data component once removed and in the remaining card body. In addition, the pressure-sensitive adhesive liner is also uncut where die cut notches have been placed and liner fibers are evident as torn. The remaining card unit, when given to the end-user, appears as though it has been torn in that area and is noticeable by the untrained eye.

Another deficiency to Prior Art Method 2 is due to the construction process and, hence, its impact on quality. Manufacturability is paramount to any process design and the above approach has several deficiencies that affect quality due to the approach for construction such as found in modern die cutting systems, where the sheet based substrate is laminated prior to die cutting and the die cutting machinery relies on the subject material to be in a consistent position for die cutting, with very little variation, in order to cut the card units with accurate, registered die cut edges. Often, artwork for card units is specifically created to extend to the cut seams of the card unit as a whole or artwork is created to extend only within the boundaries of a specific cut component within the card unit. Thus, the die cutting machinery requires that the subject material be consistent so that all cut lines appear in the appropriate artwork location. In the above approach, the unlaminated portions of the substrate, whether on one side or both, provide no firm edge by which most die cutting systems feed, cut and move the material. The "floppy" unlaminated edges provide a varying or "soft" edge which provides very little ability for the die cutting machinery to guide the material into the exact position with consistent placement and very little variation. The unlaminated design by this approach creates die cutting errors, misplaced cuts, and higher waste levels.

Further the unlaminated "floppy" substrate also is prone to wrinkling and receiving permanent creases due to being forced against machine guides during loading, feeding and stacking of the die cutting machinery often leading to higher waste and damaged product in the unlaminated areas. Also the unlaminated "floppy" substrate also is prone to picking up machine dirt and oil as it passes through any loading, feeding and stacking mechanism due to the fact that it is not protected by an over laminate.

Still further the Prior Art Method has general deficiencies in its "design of uses". Since the unlaminated portion of the substrate is intended to yield the removable data component for the card unit's identity transfer, the approach fails to prevent problems in the use of the resulting unlaminated data component when the unlaminated identifying card component is torn from its related card unit, the substrate can stretch and disfigure due to the stress of removal by human hands. Also when affixed to the data components secondary use (e.g. customer application), if stretched or disfigured, the data component no longer lays perfectly flat and can affect the appearance and performance of the customer application for example. Performance in this case is affected by the handling and collating of multiple applications where an upturned edge of the data component "catches" the edge of another application during processing and drags the second application out of position. Since the pressure-sensitive adhesive tape carries an adhesive strip that is narrower than the removable data component, both the side edges of the data component, once affixed to its secondary use position, are void of adhesive material directly underneath the edges of the unlaminated substrate and this "ledge" invites other paper applications, for example, to be caught underneath this ledge during application processing which may slow down card issuer application data entry processing.

In a variation of the Prior Art Method 2, the substrate sheet is laminated fully where no portion of the substrate edge is left unlaminated on one or both sides of the substrate. For example, an 8 inch substrate sheet is laminated 8 inches across. A card unit and all its possible components are cut as a whole from the laminated area presenting a finished card unit with the entire unit laminated. Similar to the previously discussed, data for a removable identifying card component has been previously imaged on the substrate sheet that the manufacturer may die cut or perforate a shape surrounding the data whereby the card issuer can break away this laminated portion of substrate and use that portion to transfer the card unit's identity to other uses. The remainder of the card unit consists of all other related components and may be issued to the end-user by the card issuer.

However, some form of tape, staple, or other affixing device must be used to adhere the laminated identifying data component to the related use to assure proper data linkage and end-user data registry as described above. Once again, Prior Method 2 includes the placement of a common pressure-sensitive 3-layer adhesive tape (LINER+ADHESIVE+LINER) to the surface, but in the variation, the surface receiving the pressure-sensitive tape is the outer surface of the lamination opposite the identifying data. This tape is described more fully above. The tape is unrolled along the laminated surface of the entire substrate sheet and is die cut with the rest of the card unit whereby the laminated substrate carrying the identifying data for transfer is cut to appropriate size for a removable component and the pressure-sensitive tape is cut to the same linear length. At the time of card issuance, the laminated removable component holding identifying data is removed from the card unit, the pressure-sensitive adhesive's liner is removed by the card issuer and the resulting component can be applied to any secondary use requiring identity transfer.

Prior Method 2 second approach has several deficiencies inherent to its art, including the appearance of the finished card unit, the process of construction and impact on quality of the card unit and the "design for use" of the removable components that have limited its success in the industry. Customer feedback in the industry has observed numerous undesirable issues.

The significant appearance effect of the off-white and sometimes printed "REMOVE" liner that extends the entire length of the laminated card edge detracts from the card unit's appearance. The card's appearance from the front is most important from a marketing perspective per the discussion on front versus back artwork above. This pressure-sensitive adhesive liner takes attention away from the card unit's printed graphics and does not fit in well with any common card unit design.

In order for the laminated identifying data component to remain intact within the rest of the card unit during die cutting, small notches are ground into the cutting die throughout the circumference of the removable data component's shape with the intention of not cutting the substrate and laminate in several locations throughout the circumference of the shape. While this cutting modification assists in the data component's remaining in place, they are a detriment to appearance due to the fact that in order to remove the data component from the card unit, those small areas are not cut in the data components and the circumference must tear away as the component is removed. These tears, with laminate added to the substrate, appear as bigger burs or bumps or stretched substrate fibers in both the data component once removed and in the remaining card body. In addition, the pressure-sensitive adhesive liner is also uncut where die cut notches have been placed and liner fibers are evident as torn. The remaining card unit, when given to the end-user, appears as though it has been torn in that area and is noticeable by the untrained eye. Also, the remaining card unit, when given to the end-user, appears with an uneven cut edge on each side of the removed data component's prior position and is noticeable by the untrained eye.

Manufacturability is again an issue for Prior Method 2 due to different deficiencies that affect quality due to the approach for construction. In the above approach, since the entire substrate sheet is laminated, the pressure-sensitive adhesive tape is applied to the laminated surface of the entire edge of the sheet, on one or both sides, depending on the complexity of the sheet's design and card contents. This surface addition adds an additional 20-25% sheet thickness in the edge area only due to the adhesive and liner thickness. The result of this significant off-balance sheet thickness is the difficulty in stacking uncut sheets in the same orientation without causing the resulting stack as it grows in height to grow 20-25% higher on one side versus another. At a certain stack height, the stack is unstable and sheets can slide off the stack. Additionally, regardless of how many pressure-sensitive adhesive tape stripes are applied to a laminated substrate sheet, the sheets are difficult to stack and collate because when shuffled, a top sheet will catch the raised edge of the adhesive tape on the sheet beneath, requiring more labor to separate the stack to reinsert the "caught" sheet squarely between two others.

Still another deficiency is the Prior Art Method 2 is the "design for use". The most common industry secondary use is the affixing of the removable data component to a customer application form, completed by the end-user of the card unit and transferred to the card issuer in exchange for the card and its associated rights and privileges. The end-user has written or typed his personal and/or demographic data on the form and an additional space on the form is reserved for the transfer of the removable data component from the card unit to the space on the form. The card issuer places the data component on the form and it is to remain in that position through the life of the form's processing. In processing, the form goes directly to data entry and its contents are typed into a computer database via human keystrokes. In this process, the form is stacked, boxed, separated for entry, and re-stacked and re-boxed. Increasingly, technology is allowing automated scanning of applications where stacks of customer application forms are loaded into an automated feeder/scanner and the forms are fed into a scanner, one at a time, and a picture is taken of the form and the form is then ejected. The picture is saved for later data entry. If the removable data component, when mounted to the application form is too thick or has un-affixed edge seams with the form beneath, the automated scanning devices jam and cannot feed the applications. This is the case with current automated systems and Prior Method 2 which yields the very thick data component if the customer wishes to have a protected data component during transit of the card unit and the uneven adhesive layer between the component and the form beneath.

When the removable data component for the card unit's identity transfer is laminated, the above approach incurs unique problems in the use of the resulting laminated data component. The most common laminated substrate sheet thickness, in its finished form, is 30-mil (0.030 inches). With the addition of the adhesive tape and liner, this thickness swells to 35-37 mil (0.035" to 0.037"), depending on tape specifications. Using the above example of a paper customer application form, the form is commonly 4-6 mil (0.004" to 0.006") thick. When the fully laminated removable data component is removed from the card unit and placed upon a customer application form, the resulting combined thickness is 39-43 mil (0.039" to 0.043") thick. Performance in this case is affected by the handling and collating of multiple applications where such a significant addition of thickness due to the data component causes a stack of paper applications to tilt unsteadily at any stack height of 3 inches or more, where the top applications will slide downward due to the stacks imbalance. In addition, such a thick data component easily "catches" the application above and complicates application processing, which is performed with thousands of applications in stacks awaiting data entry.

As in the first approach, since the pressure-sensitive adhesive tape carries an adhesive strip that is narrower than the removable data component, both the side edges of the data component, once affixed to its secondary use position, are void of adhesive material directly underneath the edges of the laminated substrate and this "ledge" invites other paper applications, for example, to be caught underneath this ledge during application processing and slowing down card issuer application data entry processing.

In both approaches for Prior Art Method 2 described above, a very significant deficiency has been revealed to the industry over many years that either the unlaminated substrate in first approach or second, or the laminated substrate in the second, the pressure-sensitive adhesive tape and liner, applied to the surface, is exposed to air, humidity, dust, heat/cold and friction. The consequences of such exposure have proven to limit the "shelf life" of manufactured card units. Proven by customer feedback and known properties of adhesives, especially pressure-sensitive adhesives, exposure to such elements shortens the life and durability of the adhesive properties. Finished card units, shipped to the customer, are not necessarily used within any known span of time. Cards may remain unused for months or even years, depending on the card issuer's intentions, purchasing strategies, business circumstances and other reasons. The card issuer may store the unused card units in environments that are not climate controlled. The card issuer may leave open the card unit box in which several hundred or thousand cards are stored, thereby exposing the product to the environment. Additionally, card units may be bounced, removed from their box, returned to their box, sorted, inventoried, repacked, dropped and receive various care during storage. All of the above circumstances can lower the value of the customer's investment because the product is becoming less usable due to the impact upon the exposed adhesive and liner properties. Certainly, any customer storing cards will be inventorying those card units as assets and assuming full asset value when the cards are distributed to points of issue. Customer feedback on aged cards manufactured by this approach report the removable data component fails to adequately "stick" to the secondary use such as a customer application form.

In such cases, the component sticks temporarily and then falls off the application during movement of that application to many points of processing. Of note, the thicker the data component, the higher likelihood that it is bumped by an adjacent application and if the adhesive is aged, falls off. As stated above, this scenario results in an orphaned customer application with no specific reference to the issued card unit for that customer.

Generally, air, humidity, dust, heat and cold temperatures affect the properties of the adhesive. Friction refers to the cause of the adhesive liner, which is easily lifted, being caught during boxing, sorting and handling, where the liner is lifted either briefly or left hanging off the card unit and the adhesive is exposed to the air for a period of time.

Generally, Prior Method 2, with either the laminated or unlaminated removable data component as described above, requires the customer to choose between two polarized options of either a thin, unprotected substrate data component where the surface of the associated data is exposed to scuffing, heat, moisture and dirt or a thick, sometimes 30 to 35 mil protected laminated substrate data component that incurs further cumbersome issues for the processing of secondary use items such as customer application forms, as described above. What is needed is means to generally solve all of the above issues, for either of the Prior Art Method 1 or Prior Art Method 2, and creates additional opportunities for the manufacturer and the card customer.

The current industry is constantly looking for cheaper, effective, and durable uniquely identifiable transactional cards as well as methods and systems for implementation, imaging, affiliations with other uses requiring the transfer of a card unit's identity, and distribution to the consuming public. Thus, there is a need for a new and improved transactional card, system, and method of identification, component removal and transfer, card identity transfer and general use as outlined. The current invention provides an inexpensive and time saving device, improved card product appearance and functionality, method for making, and system where the prior art fails.

SUMMARY OF THE INVENTION

In view of the foregoing disadvantages inherent in the known types of transactional cards, systems of use and methods of making now present in the prior art, the present invention provides a cheap, convenient, and durable, unique identifying data component to most accurately and easily transfer the identity of a card unit to a secondary use such as a customer application form where a data association between the card's end-user and the secondary use is required. Additionally, the present invention provides a simple assembly method for adhesive layers and the inclusion of other technologies. As such, the general purpose of the present invention, which will be described subsequently in greater detail, is to provide a new and improved transactional card system and card identity transfer method which has all the advantages of the prior art and none of the disadvantages.

To attain such, the invention includes a modified card unit matrix wherein a linear space is dedicated in the card unit's artwork as the designated path for the removable data component with unique identifying information related to its card unit and other card unit components. All standard printing by conventional methods may be completed on the substrate before it may be laminated. All related data for all card units within the sheet and their components to be imaged at this stage may be previously applied via data imaging equipment, including the data application to any card unit components to be removed and applied to a secondary use. The substrate sheet is thus prepared for the invention. The substrate may then have protective planes adhered to the substrate where it is desired to have consumer items like cars and key fobs. Other regions of the substrate are not coated with an adhesive, but rather a tape or element is used such that a removable data component may be removed and reused or placed on such things as forms or applications where it is desired to identify the card unit with an end user and end user's specific information or data.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved transactional card and system, method for making, distributing, using, identity transfer and encoding thereof.

It is a further object of the present invention to provide a new and improved transactional card system and identity transfer method which is of a durable and reliable construction and may be easily and efficiently manufactured and marketed.

An even further object of the present invention is to provide a new and improved transactional card system and identity transfer method which is susceptible to a low cost of manufacture with regard to both materials and labor, and which accordingly is then susceptible to low prices of sale to the consuming industry, thereby making such invention economically available to those in the industry.

Still another object of the present invention is to provide a new and improved transactional card system and identity transfer method which provides all of the advantages of the prior art, while simultaneously overcoming some of the disadvantages normally associated therewith.

It is a further object of the present invention is to provide a new and improved transactional card system and identity transfer method which may provide a stronger overall card unit which generally encapsulates the entire card unit on all four sides, with no protruding edges, layers, or burs due to adhesive tape for removable card components and simultaneously overcomes appearance problems associated with the prior art.

Yet another object of the present invention is to provide a new and improved transactional card system and identity transfer method that provides a new construction and method for one of the card unit's uniquely identified and matching components, whereby the transfer process from card unit to application has been enhanced significantly for the card-issuer, the quality and security of the transferred element is greatly expanded as well as a new method of manufacturing.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there are illustrated preferred embodiments of the invention.

BRIEF DESCRIPTION OF THE PICTORIAL ILLUSTRATIONS GRAPHS, DRAWINGS, AND APPENDICES

The invention will be better understood and objects other than those set forth above will become apparent when consideration is given to the following detailed description thereof. Such description makes reference to the annexed pictorial illustrations, graphs, drawings, drawings, figures and appendices wherein:

FIG. 4 is a top view of a preferred embodiment of the invention.

FIG. 5 is a side view of a preferred embodiment of the invention generally depicting the embodiment in FIG. 4.

DETAILED DESCRIPTION OF THE PREFERRED EMBODIMENTS

Figure 1:
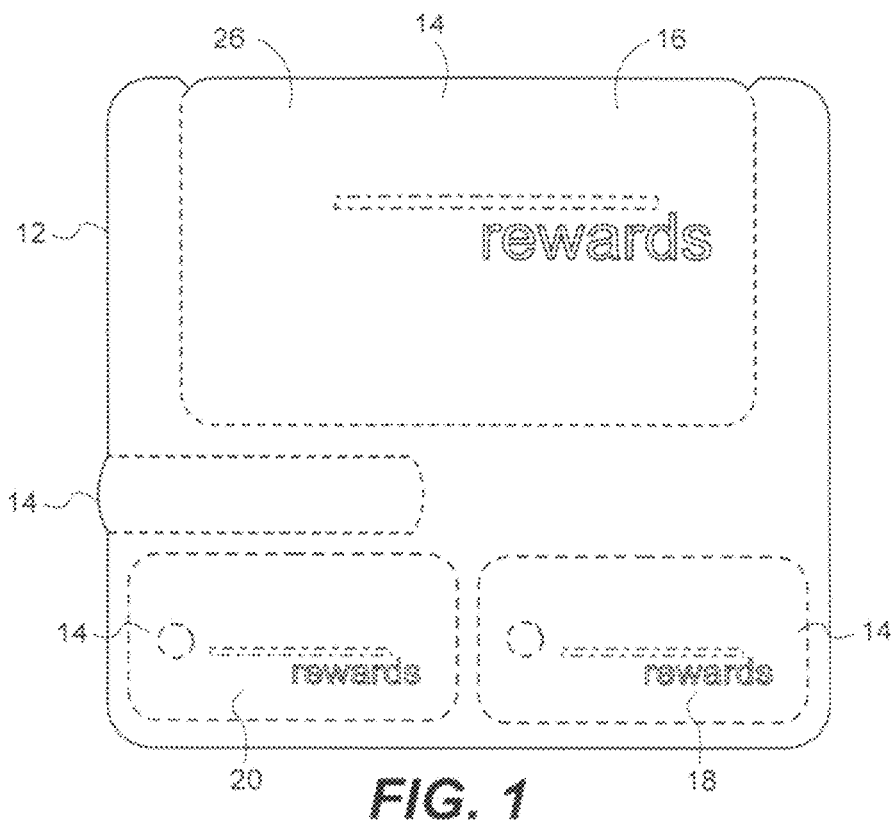
FIG. 1 is a top view of a preferred embodiment of the invention.
Figure 2:
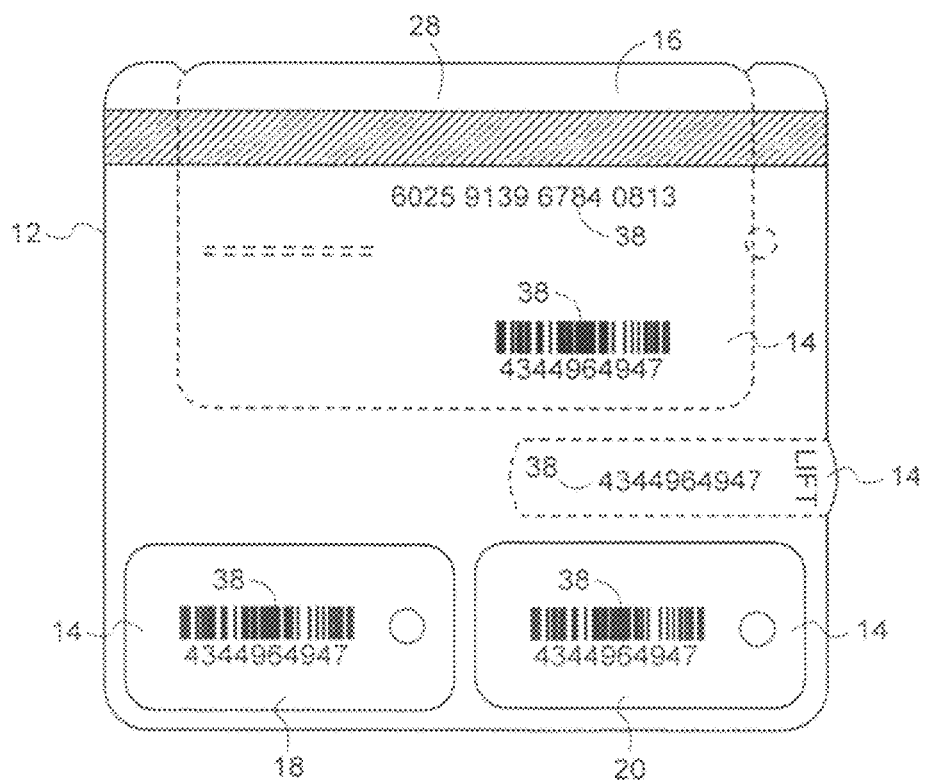
FIG. 2 is a bottom view of the preferred embodiment of FIG. 1.

The current invention addresses operation, manufacturing, systems and methods for producing new and improved transactional card units. Referring now to the drawings, wherein like reference numerals designate corresponding structure throughout the views reference numeral 10 generally refers to a new and improved transactional card unit, system, and encoding method in accordance with the present invention.

Now referring to the drawings generally and FIG. 1 in specific, in a preferred embodiment, invention 10 may include a matrix or carrier portion 12 which may be of like materials surrounding the die cut components 14. Of note, the accompanying figures may depict lines across the matrix 12 for generally indicating cut lines, magnetic stripes and so forth which will be discussed below. Matrix 12 may be composed of several layers which will be discussed below.

Die cut components 14, by example, may be a card 16, a first key fob 18, a second key fob 20, and a first removable data component 22 and a second removable data component 24 herein after refereed to collectively or individually as removable data component 25. The preferred embodiment should not be considered to be limiting the invention to the arrangement depicted and discussed. It is understood that many variations may be included in the die cut components, such as but not limited to more or less key fobs, no key fobs, more or less removable data components, no data components, no card, multiple cards, shape and size of matrix and so forth. Although numerous embodiment have been provided, it is understood that the depictions should are for example purposes and invention should not be considered limited to the depictions.

Matrix 12 has a top or first side 26 and a second or bottom side 28. It is contemplated that top 26 may generally include art work and the bottom side 28 have fixed or variable data applied to specific desired areas. It is understood that the art work may be on both sides, combinations of both sides, or on bottom 28. Furthermore, it is understood that fixed and variable data may be but not limited to bar codes, numbers, letters, designs, chips, encoded material, un-encoded material, combinations of the aforementioned and so forth. It is also contemplated that invention 10 may also utilize other known methods wherein information may be utilized in a fixed format, variable format, and combinations thereof for the desired want of fixed and or variable data.

Figure 20:
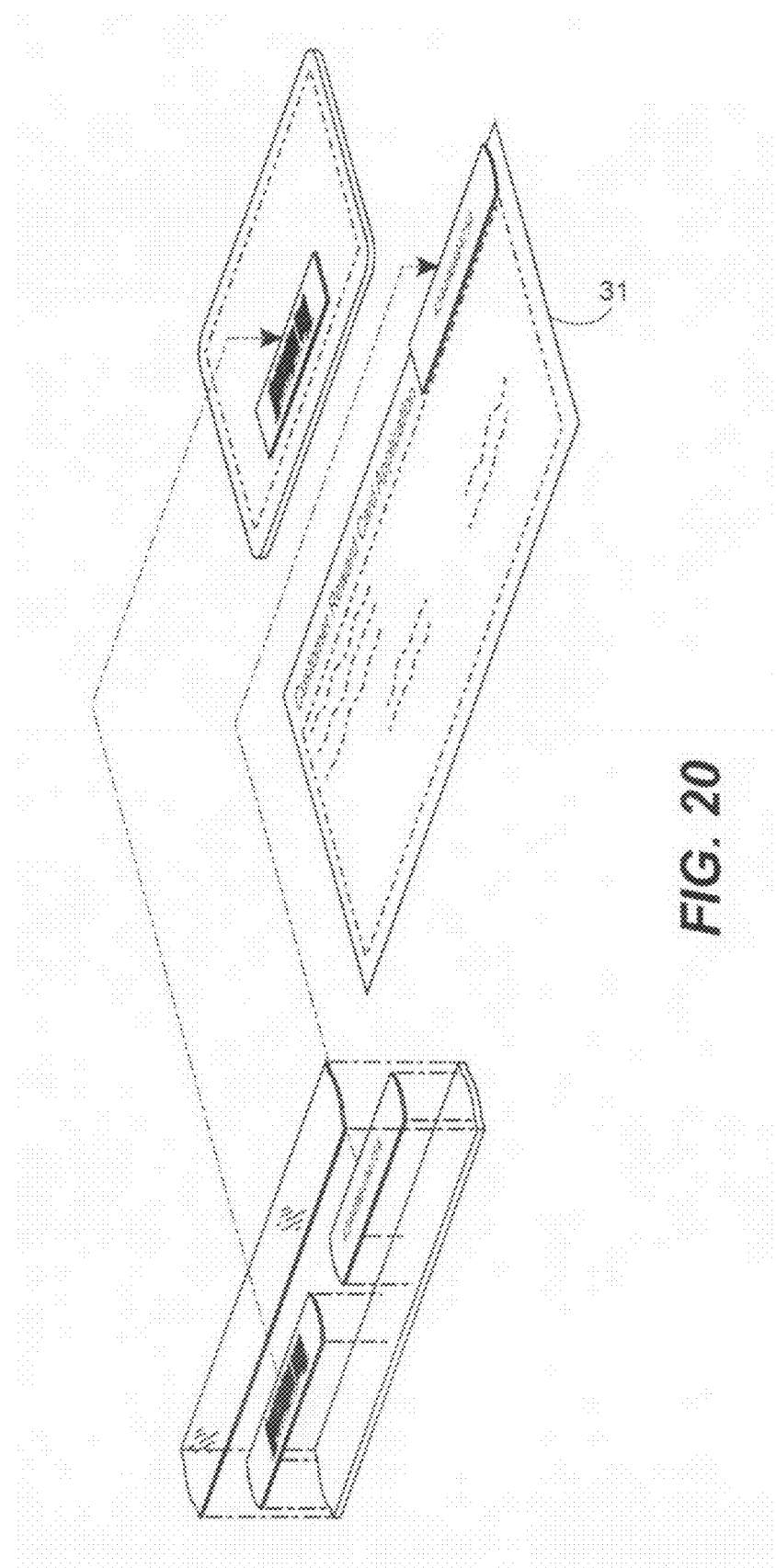
FIG. 20 is a partially exploded perspective view of the preferred embodiment.
Figure 21:
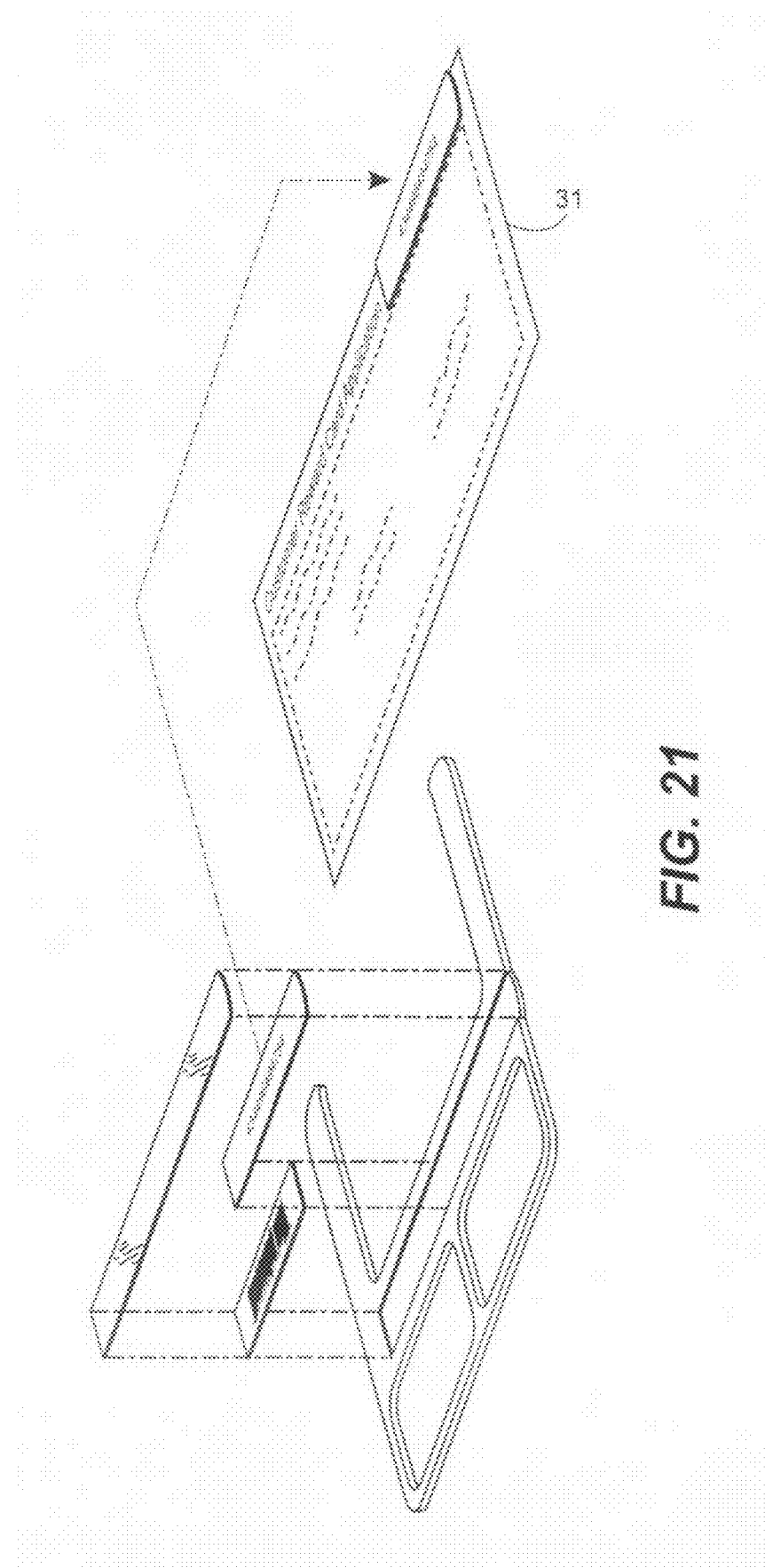
FIG. 21 is a partially exploded perspective view of the preferred embodiment.

Matrix or carrier 12, along with the various die cut components 14 may often be referred to as card unit 30 with the understanding that the term should not be considered limiting, but instead utilized to generally describe an individual unit frequently used in transactional card systems. In a preferred embodiment, a removable data component 25 may be included that, when removed from the overall carrier 12, a transfer of the identity may occur from the carrier 12 of the card unit 30 to a secondary use such as but not limited to the placement on a registration form 31 or forms as generally depicted in FIGS. 20 and 21 is removed, the top layer of adhesive liner will remove exposing permanent adhesive adjacent to substrate which holds identifying data on its opposite side. Card unit 30 may be comprised from several material layered or sandwiched together forming card unit 30. It is contemplated that card unit 30 may have varying portions of layers.

It is understood that the removable data component 22 is intended to be reused in conjunction with such things, but not limited to form 31. Other types of application are contemplated other than forms and the term should not be considered to limit the invention. It is understood that the invention may include use with forms, packaging, applications, shipping, paperwork, goods, services and so forth.

In a preferred embodiment, a first protective plane 32 is provided which may be made from a polyester or other type of plastic material and likewise a second protective plane 34 are utilized for generally covering the top 26 and bottom 28 respectively. First protective plane 32 and second protective plane 34 generally sandwich or cover substrate 36.

Substrate 36 may be a printed, unprinted substrate, or combinations thereof, such as but not limited to paper, plastic, combinations of materials, and so forth, with variable or fixed data 38 imaged upon top surface 40 of substrate 36, bottom surface 42 of substrate 36, or combination thereof, representing a unique data relationship among all imaged card unit 30 components 14 inside areas designated for die cut seams wherein components 25 may be removed and still be identifiable to a specific card unit 30. In a preferred embodiment, substrate 36 may be made of TESLIN® or like material such as another dimensionally stable, highly filled, single layer, microporous film that allows inks, adhesives, coatings and laminating films to penetrate into its structure to form strong anchor points with the substrate.

It is contemplated that top surface 40 of substrate 36 is generally attached to first protective plane 32 by adhesive 44 and bottom surface 42 is generally attached to second protective plane 34 by adhesive 46. The material used for adhesives in general is known in the art and may be resin of a permanent nature which may be used in conjunction with heating and other means for a permanent adhesion where desired. In a preferred embodiment, polyethylene may be used. It is understood that the adhesives may not cover all portions of substrate 36 of card unit 30 which will be discussed below.

It is contemplated that portions of card unit 30 would be adhesively attached such that certain die cut components 14, such as but not limited to card 16 and key fobs 18 and 20, would be generally fixed or attached to the protective planes 32 and 34 and other die cut components 14, such as but not limited to removable data components 22 and 24, would be attached by a different means wherein the data components could be removed from the card unit 30 and transferred to another object, like registration form 31. It is understood that certain die components 14, such as but not limited to card 16 and key fobs 18 and 20 are preferably of a sturdy construction wherein the protective planes are attached in a durable fashion. It is also understood that other certain die components, such as but not limited to removable data components 22 and 24 should be fixed in a durable fashion to the card unit 30, but also generally easily removed. This may be accomplished by applying different adhesives, tapes, or combinations thereof in some regions and not in others such that some die cut components 14 are a finished product for consumer use such as but not limited to card 16, key fobs 18 and 20, and so forth with durable protective layers or planes 32 and 34 on both sides of substrate 36. Other regions, such as but not limited to the location for the removable data components 22 and 24, would be generally easily transferable to such things as registration form 31 wherein a protective planes 32 and 34 would not necessarily be desirable. Furthermore, as will be discussed below in greater detail, it is contemplated that some die cut components 14 may be "cut" for generally easily removability from card unit 30, such as card 16 and key fobs 18 and 20, whereas removable data component 22 and 24 may be "cut" differently than the aforementioned in light of the purpose that may be intended.

In a preferred embodiment, adhesives 44 and 46 are respectively applied to substrate 36 top surface 40 and bottom surface 42, but not in a designated region or regions such as but not limited region 48 where removable data components 22 and 24 may reside. Once again, it is understood that numerous configuration of card unit 30 are contemplated and that region 48 may be located in numerous position on card unit 30 with numerous types and numbers of removable data components. Also, it is contemplated that removable data component may be just be one die cut piece with more than one form of data or reusable and removable data.

Accordingly, invention 10 may include the use element 50 which may be a clear tape with sticky surfaces on both sides, also known as double stick tape or double transfer tape. It is further contemplated that tape may be only sticky surfaced on one side. The terms tape, adhesive, and sticky should not be considered limiting the scope of the invention and are used for convenience purposes with the understanding that adhesives are not necessarily tapes and vice versa, but may be. The term "sticky" is also used for convenience. It is understood that the term may imply a quality of adhesion, but not necessarily. It is contemplated that in a preferred embodiment of the invention that, adhesives 44 and 46 could be a tape form and element 50 could be an adhesive without a tape form. In a preferred construction, element 50 has a top sticky surface 52 and a bottom sticky surface 54.

Element 50 may be used or applied in a linear fashion across card unit 30 such that region 48 and any removable data components or other die cut components 14 therein, may generally have a layering of first protective plane 32, element 50 with the top sticky surface 52 in contact with top protective plane 32 and bottom sticky surface 54 in contact with top surface 40 of substrate 36, and bottom surface 42 in contact with second protective plane 34. This configuration would allow, with the proper cutting of the die components 14, the ability for the user to pop off or generally remove second protective plane 34 thereby expose substrate 36 having data 38 which would be stuck or otherwise attached to element 50, and which could then be peeled from first protective plane 32 and applied as desired to another item because the removable portion of substrate 36 attached to element 50 would then have a reusable stick surface for attaching to another item.

In another preferred embodiment, a second element 56 may be utilized wherein second element 56 may be another substrate with data, printing, double sided tape, single sided tape, combinations of the aforementioned, and so forth. It is contemplated that second element 56 may allow for a second data transfer from card unit 30, used in combination with first data transfer, and so forth.

It is further contemplated that the entire substrate is coated or covered with adhesives and that an interference layer be used respective to the removable data components. In a preferred embodiment, the removable data component or components 22 and 24 region 48 may be covered with adhesive with no tape used, but instead having an interference layer such that element 50 and or element 56 may be something other than a double sided tape that would provide the ability to still remove the data components for a second affixation. In accordance with invention 10, it is contemplated that the data surface of the data component may include a protective plane bonded on top of substrate 36 and data therein, with element 56 acting as an interference layer, whether coating or liner, is not used. It may also be desirable to have a thin or thinner removable data component, wherein element 56 (or even element 50) represents either the coating on top of the data and substrate 36 that prevents a lamination bond with second protective plane 34 (or first protective plane respectively with element 50). It is further contemplated that element 56 may be a single, plain paper or plastic "interference" liner that may be but is not limited to opaque, white, colored, transparent, combinations of same and so forth.

Furthermore, it is contemplated that element 56 may run generally parallel to element 50 which may be an adhesive assembly where element 56 is generally adjacent to the data and substrate 36 that when cut and removed from card unit 30, element 56 essentially covers an adequate surface of the data and substrate 36 so that the quality, clarity, readability and surface of the data and substrate 36 is not altered from a like-original state (pre-lamination). It is contemplated that a preferred embodiment, when pressed together to a finished product, may generate card unit 30 thickness between 10-mil and 37-mil. The dotted lines may generally indicate a preferred planer alignment of the adhesive assembly, data, and interference liner or element 50 and 56 with the understanding that none, one or both elements may be utilized.

Another preferred embodiment may generally be referred to as a Two-Layer Encapsulated Resin Data Component Embodiment and Configuration with potentially an opaque white adhesive assembly. The embodiment may generally be accomplished by the affixing of a specially-designed transparent 5-layer permanent ADHESIVE ASSEMBLY (LINER+ADHESIVE+LINER+ADHESIVE+LINER) directly to the laminating material intended to laminate the substrate surface containing the traditional "card front" artwork and is the side of the substrate opposite the side containing the data imaged for the removable data component that will perform the card unit's identity transfer. The adhesive assembly is applied to any laminating material of any make, size and construction prior to the laminate material making contact with the substrate surface for final lamination of the two planes. The adhesive assembly may be wider than the eventual removable data component that it is intended to support so that the underside of the data component is sealed flush when removed for any secondary use such as a customer application form. As the adhesive assembly is applied, one outside liner is removed leaving permanent adhesive exposed on the side of the adhesive assembly opposite the laminate plane on which it is being applied. Although the adhesive assembly has provided better results when applied directly to the laminating material prior to substrate lamination, an alternative in this embodiment is to apply the adhesive assembly directly to the substrate simultaneously with it's contact with the laminating material as one liner is removed prior to contact as described above. As the lamination plane is sealed onto the top side of the substrate, the adhesive assembly is now sealed between the laminate layer and the substrate layer where the current top side sealed construction, from top to bottom is LAMINATE+LAMINATE ADHESIVE+LINER+ADHESIVE+LINER+ADHESIVE+SUBSTRATE.

Alternatively, this embodiment can also include a specially designed 3-layer permanent adhesive construction where the resulting top side sealed construction, from top to bottom is LAMINATE+LAMINATE ADHESIVE+LINER+ADHESIVE+SUBSTRATE, where the middle liner of the adhesive assembly is removed where adhesive assembly web strength is less of a requirement.

It is contemplated that the bottom side of the substrate surface carrying the specific data imaged for the removable data component that will perform the card unit's identity transfer. The bottom side may or may not receive an additional plane of laminate in this embodiment (referred to below as different embodiment). For most card industry applications, a second layer of laminate is bonded to the bottom side of the substrate on all substrate surfaces so that no area of the finished card unit remains unlaminated for the customer. This embodiment includes either construction choice. If the bottom side is laminated, the resulting layered card material assembly is now sealed between two laminate layers and the entire construction, from top to bottom is LAMINATE+LAMINATE ADHESIVE+LINER+ADHESIVE+LINER+ADHESIVE+SUBSTRATE+LAMINATE ADHESIVE+LAMINATE. If a 3-layer adhesive assembly is used, the resulting layered card material assembly is now sealed between two laminate layers and the entire construction, from top to bottom is LAMINATE+LAMINATE ADHESIVE+LINER+ADHESIVE+SUBSTRATE+LAMINATE ADHESIVE+LAMINATE. The embodiment may have an adhesive assembly that is either opaque or transparent and can be colored per marketing initiatives. Potentially unique to this embodiment is the position of the adhesive assembly and the removable data component away from any edge of the finished card unit. There are appearance and structural advantages to constructing the card unit with the underlying adhesive and interference layers not common to any edge of the finished card unit.

Additionally unique, scented ingredients can be applied to any layer or component within the card unit (e.g. fruit, berry, new car, chocolate) such that when peeled away, separated, removed, a scent is more evident than before separation. Additionally unique is for the adhesive assembly to contain various radio frequency "RF" components where the RF components can be applied to a card product via a tape/liner affixing process where encapsulation may be accomplished.

Figure 3:
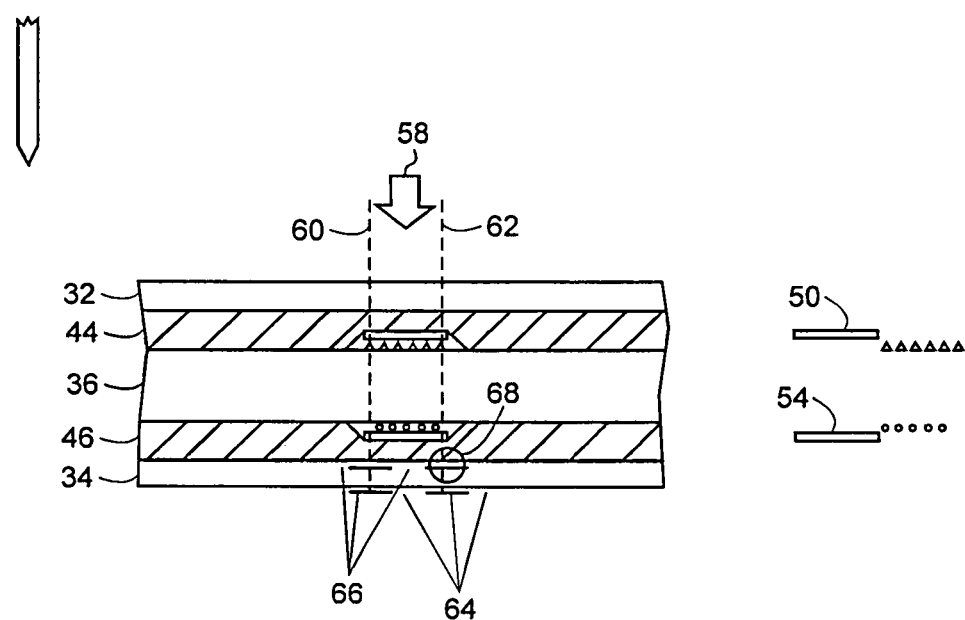
FIG. 3 is a side view of a preferred embodiment of the invention generally depicting cut lines for preparation of a card unit.
Figure 6:
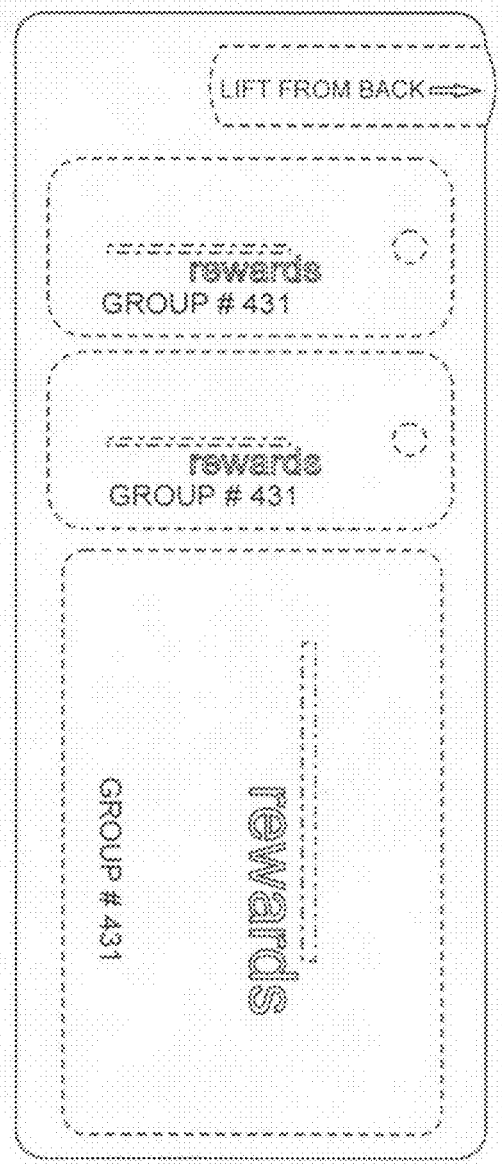
FIG. 6 is a top view of a preferred embodiment of the invention.
Figure 7:
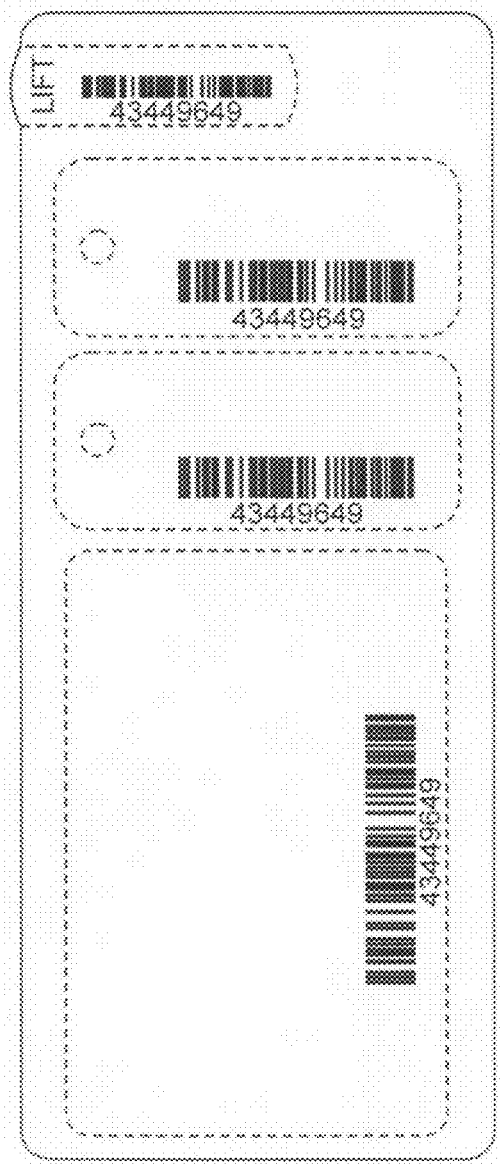
FIG. 7 is a bottom view of the preferred embodiment of FIG. 6.
Figure 8:
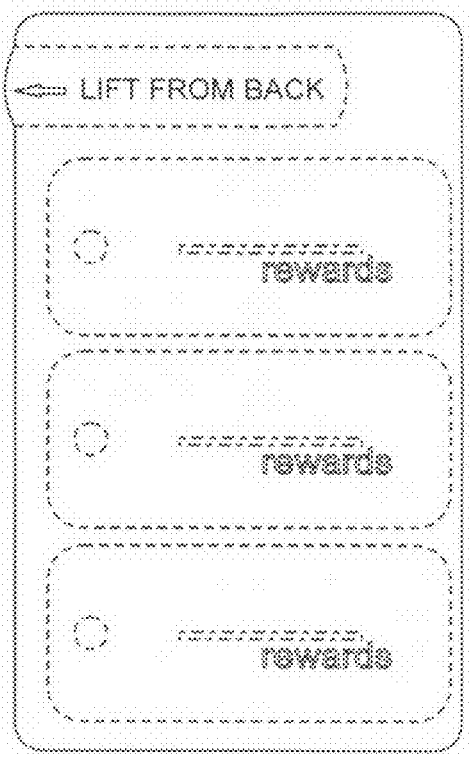
FIG. 8 is a top view of a preferred embodiment of the invention.
Figure 9:
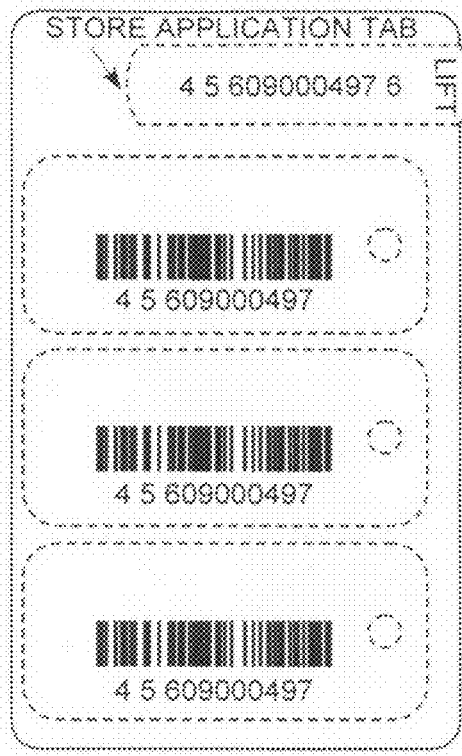
FIG. 9 is a bottom view of the preferred embodiment of FIG. 8.
Figure 10:
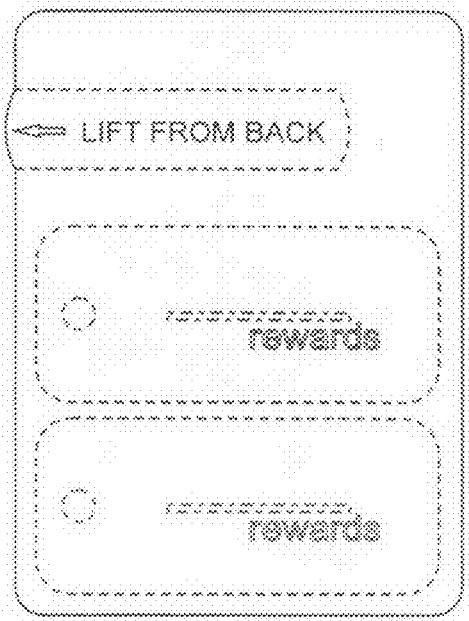
FIG. 10 is a top view of a preferred embodiment of the invention.
Figure 11:
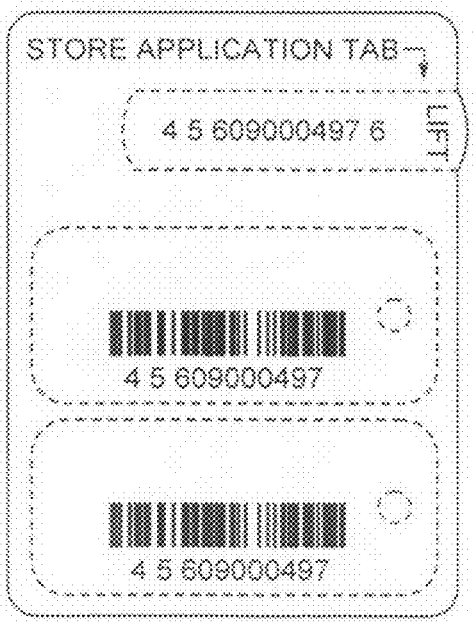
FIG. 11 is a bottom view of the preferred embodiment of FIG. 10.
Figure 12:
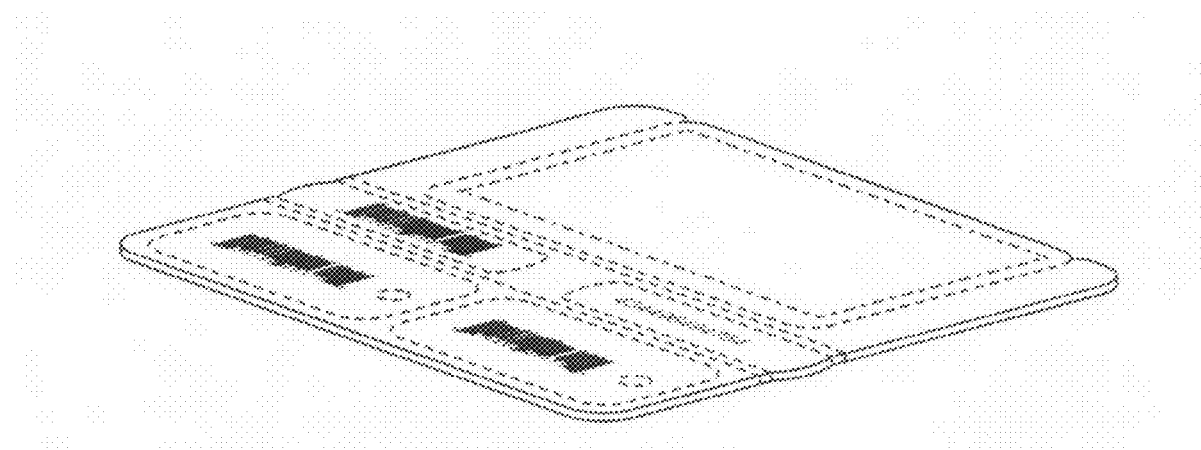
FIG. 12 is a perspective view of a preferred embodiment of the invention.
Figure 13:
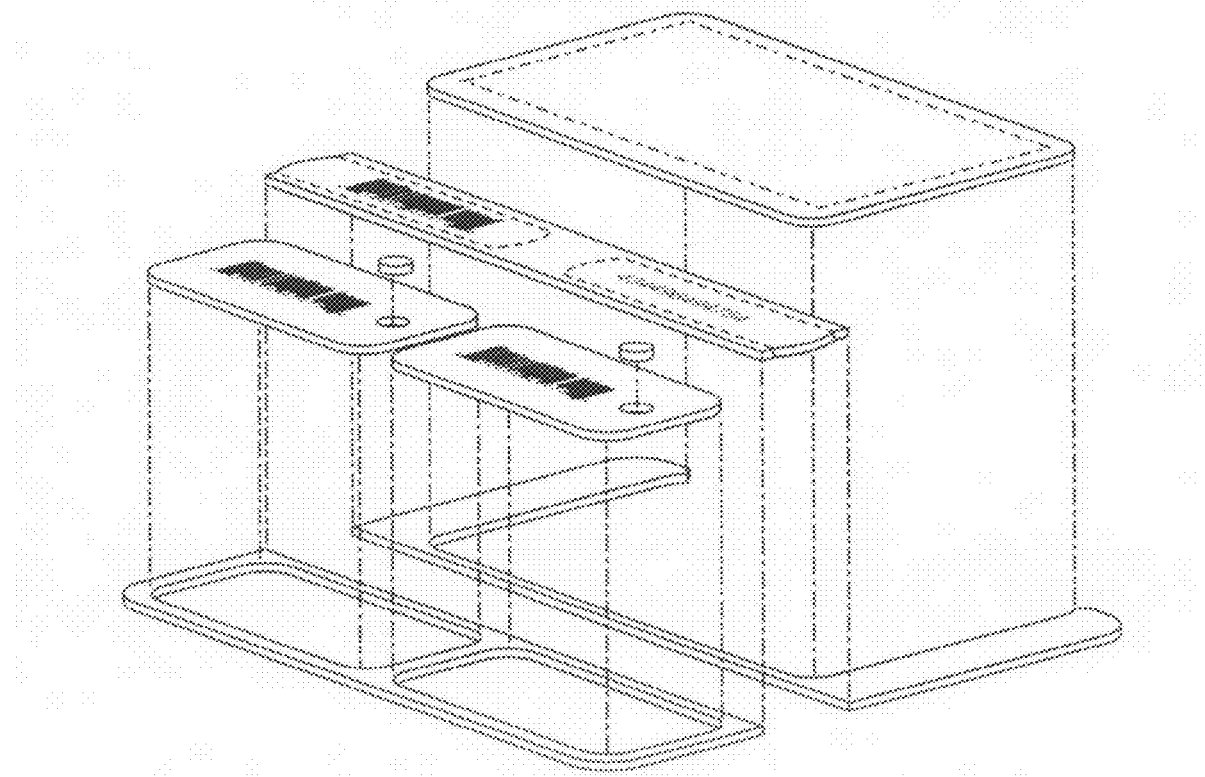
FIG. 13 is a partially exploded perspective view of the preferred embodiment depicted in FIG. 12.
Figure 14:
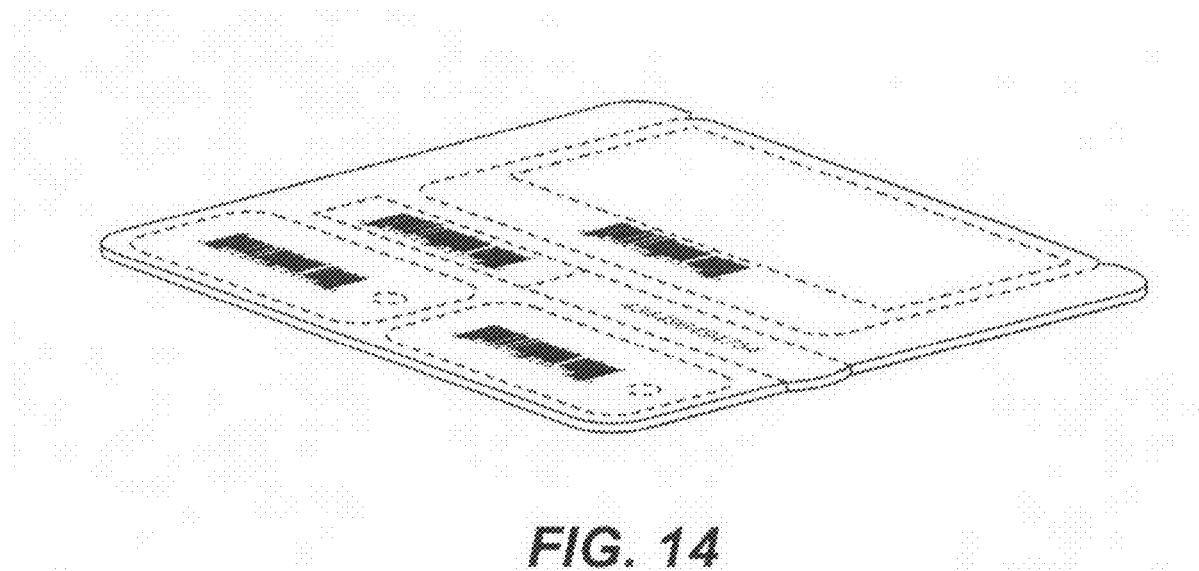
FIG. 14 is a perspective view of a preferred embodiment of the invention.
Figure 15:
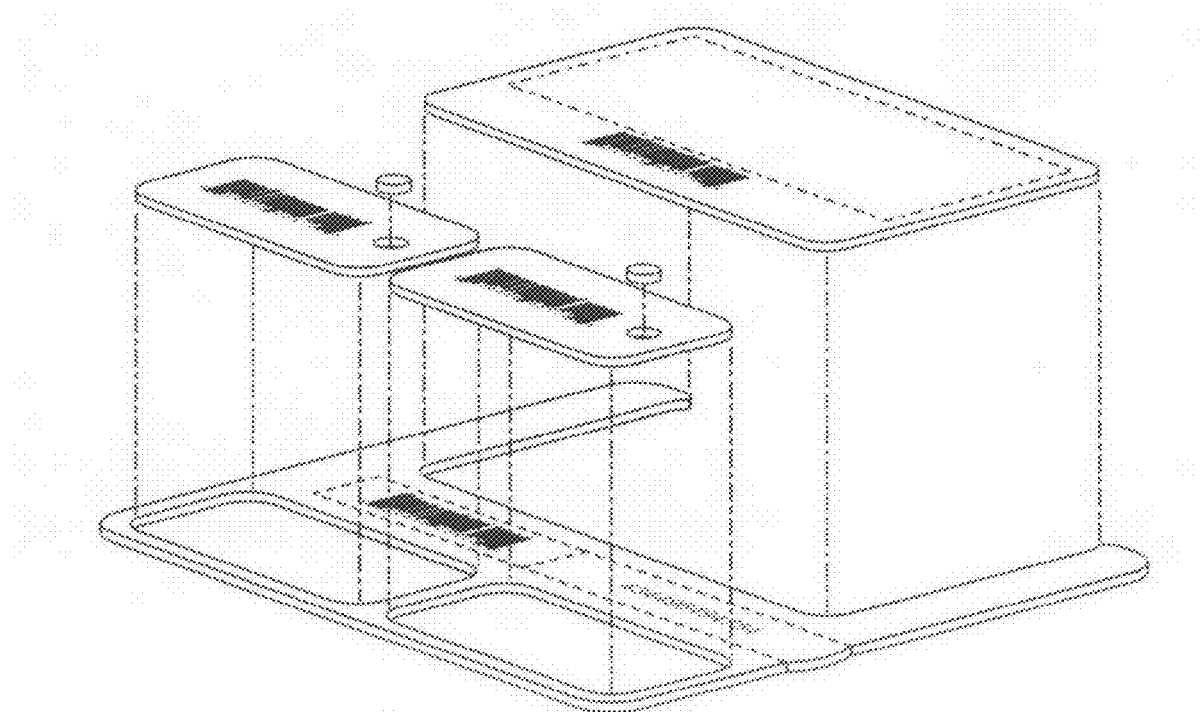
FIG. 15 is a partially exploded perspective view of the preferred embodiment depicted in FIG. 14.
Figure 16:
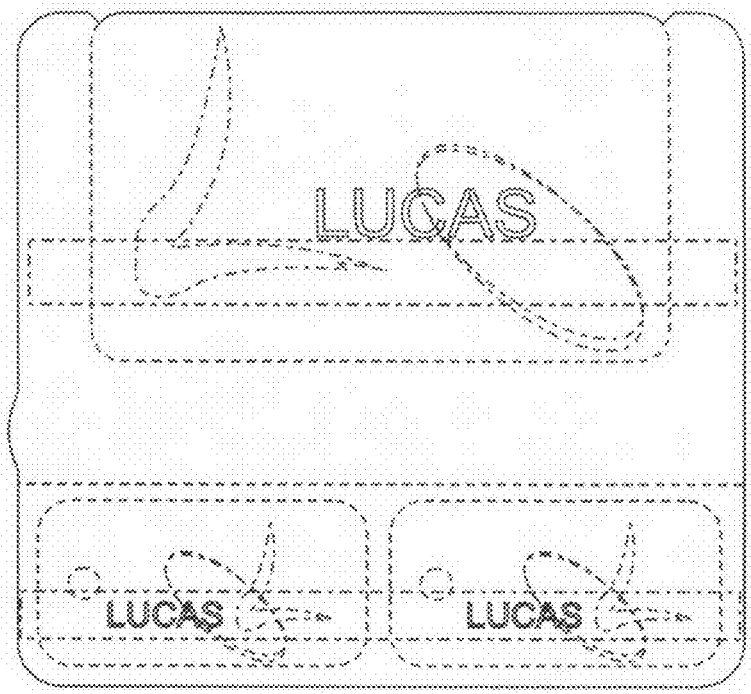
FIG. 16 is a top view of a preferred embodiment of the invention.
Figure 17:
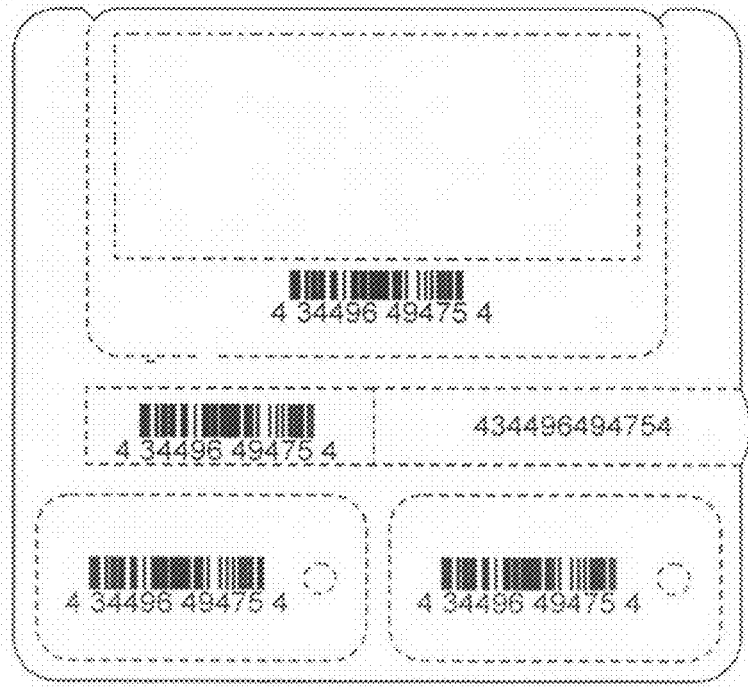
FIG. 17 is a bottom view of the preferred embodiment of FIG. 16.
Figure 18:
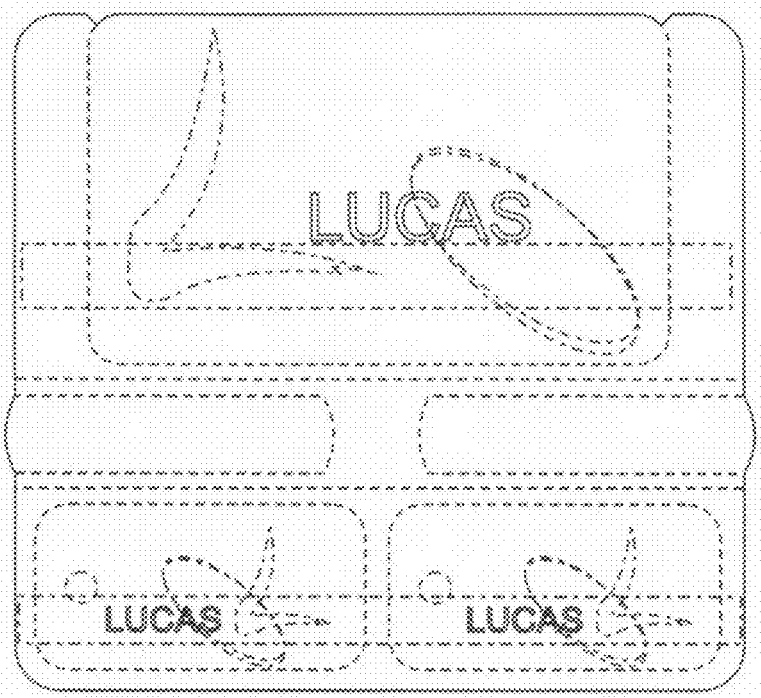
FIG. 18 is a top view of a preferred embodiment of the invention.
Figure 19:
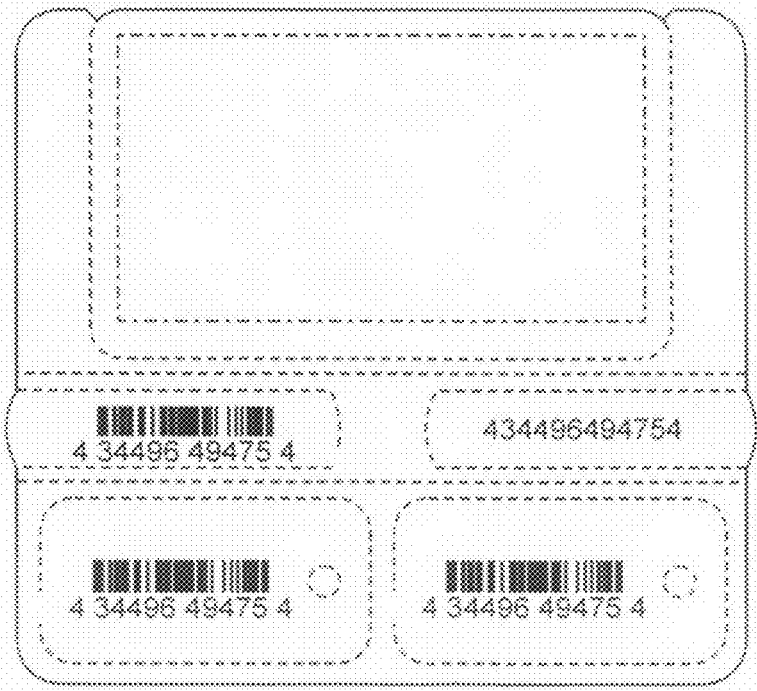
FIG. 19 is a bottom view of the preferred embodiment of FIG. 18.

Further processing for the Two-Layer Encapsulated Resin Data Component Embodiment and Configuration, includes die cutting from either the direction of top side to bottom side or visa versa as generally depicted in FIG. 3. The die cutting process may cut the entire card unit in one step or multiple cuts can be used to cut any of the removable card components individually. Following removal from the die cutting process and removal from the master substrate sheet matrix, the card unit is finished for the basic application of this embodiment. The resulting removable data component(s) intended for a secondary use, whether for transferring the card unit's identity or not, may have an environmentally sealed permanent adhesive layer on the top side of the substrate opposite the bottom side containing the identifying removable data component.

It is contemplated that invention 10 may provide a removable data component that, after the identifying data component is removed from the card unit at any subsequent point of use, it carries approximately less than ⅔ of the component thickness and materials of the prior art. Further, the removable component "pops" out of the card unit with adhesive that has been sealed from all environmental contact, and that adhesive is prepared for permanent application to any secondary use.

It is also contemplated that invention 10 will not require the card issuer to peel any fragile adhesive liners prior to using the data component because the overlaminated liner with its increased stiffness falls away from data component with its top layer of laminate and or requires no additional processing, labeling, imaging to create the intended functionality of transferring a card unit's identity to a secondary use.

It is still further contemplated that invention 10 removable data unit or component will contain related data linked to all other possible card unit components if data is applied uniquely to the specific card unit and various components and also may contain data printed with the same quality as all other card unit components if data is applied to any component.

Furthermore, it is contemplated that invention 10 removable data unit or component may contain ensured accurate alignment with data applied to all other card unit components imaged if data is applied to any components and or may carry a protective laminated surface over the bottom side of the substrate and if data is applied, over the data as well.

It is contemplated that invention 10 removable data unit or component may provides the customer with a choice of data component thickness in between the extremes of the prior art and or provides a data component that when removed and affixed in a secondary use that is less than ⅔ the thickness of prior art that utilizes a LAMINATE+SUBSTRATE+LAMINATE construction. This advantage allows for customers to experience fewer difficulties in handling and collating customer application forms, for example, because in the general card industry 30-mil (0.030") example, one layer of laminate has been eliminated from the constructed assembly.

In another preferred embodiment, invention 10 may include a One-Layer Encapsulated Resin Data Component Embodiment and Configuration that may also provide a data component that is approximately ⅓ the thickness of the fully laminated prior art if the bottom side of the substrate does not receive the opposing laminate layer yet the adhesive is encapsulated and enjoys the benefits described above. In this instance, the area on the substrate opposite the adhesive assembly is writable, printable, transferable, either before or after component transfer to a secondary use.

In still another preferred embodiment, invention 10 may include "From Three to One"—Interference Layer Encapsulated Resin Data Component Embodiment and Configuration wherein invention 10 may include other processes and material may be added via other options. Following printing of the substrate via standard printing methods described above, the substrate sheet is then imaged via data printing equipment if data is required for a removable component receiving the coating process described herein. Data is not necessary to achieve benefits from this embodiment. For descriptive purposes, data application will be included because the full benefits are realized in such use.

It is contemplated that an embodiment may include an interference layer as coating. While still in sheet form, the sheet is passed through a coating process whereby a specialized coating is applied on top of the data and surrounding substrate that will eventually become a removable data component intended to transfer a card unit's identity. The coating may cover an area of the substrate and data in any shape, size, area, density or color. The coating may be transparent but may include ingredients such as color, security inks, UV inhibitors, black light reflectivity, glow-in-the-dark characteristics, specialized security additives to prevent fraud, tampering, other security assurance means, special marketing or performance properties to entertain the card user, glitter, metalized tint, holograms, letterpress foils and other enhancements. Additional to this embodiment may be another approach to this coating. The coating can be in a solid, liquid, vapor, viscous, gelatin or powder state either before or after application. The coating may protect the underlying data and substrate in any fashion due to the coating becoming the layer on top of the data and substrate.

Additionally, to achieve the "three-to-one" embodiment, the coating can have properties which when applied to the data or substrate, render the surface of the data or substrate as un-laminatable, meaning the areas in which this coating is applied resist the lamination bonding process associated with industrial laminate and its associated choice of resins (adhesives). This enhanced feature may resist bonding with lamination at any temperature, with heat applied to activate the laminate's adhesive or no heat applied. It may resist bonding to pressure-sensitive laminates, sometimes known as "cold lamination". Such a coating may have contents including wax, petroleum additives, glycol, silicon, or any other ingredient that achieves this non-laminating enhancement. The use of this coating on any laminated substrate to prevent lamination bonding is itself a useful application in areas beyond the card industry and do not require data or a second layer of laminate opposite the laminate plane adjacent to this coating.

Using an earlier embodiment example, the overall layered construction of any removable component from the card unit under this enhancement may yield an approximate construction, from top to bottom of: LAMINATE+LAMINATE ADHESIVE+LINER+ADHESIVE+LINER+ADHESIVE+SUBSTRATE+DATA+INTERFERENCE COATING+LAMINATE ADHESIVE+LAMINATE.

In another preferred embodiment, an interfacing layer may be provided that may be a disposable liner for the bottom assembly where the removable data component's data layer is visible, instead of applying an interference coating to the data and substrate bottom surface, an interference liner is applied adjacent to the substrate and data surface where the liner, made of paper or plastic, is probably transparent but can be opaque or secured via a variety of printing and obscuring methods, and the liner does not form a chemical bond with either the substrate or data surfaces for which it has adjacent contact. This form of interference is easier for the manufacturer than the coating process because it requires no secondary coating expense and uses a relatively inexpensive interference liner. The interference liner can be a single-ply material but additional layers may be used to enhance either the component's separation from the remaining card unit material or enhance further security or marketing features of the removable component.

Using an earlier embodiment example or examples, the overall layered construction of any removable component from the card unit under this interference liner enhancement may yield an approximate construction, from top to bottom of: LAMINATE+LAMINATE ADHESIVE+LINER+ADHESIVE+LINER+ADHESIVE+SUBSTRATE+DATA+INTERFERENCE LINER+LAMINATE ADHESIVE+LAMINATE.

In either of the two previous embodiments, for example, the resulting finished card unit will contain a removable data component intended to transfer the card unit's identity to secondary uses that provides the enhanced benefits of all of the above embodiments plus may provide a data component that allows the bottom side laminate layer (closest to the data on the removable element) to be removed easily without disturbing the data's clarity, density, readability, size, shape or any other characteristic. Another enhanced benefit may be that once the removable component is separated from the card unit, the area on the substrate opposite the adhesive assembly is writable, printable, transferable, either before or after component transfer to a secondary use.

Further, it may provide a data component that is approximately ⅓ the thickness of the fully laminated prior art if the top side laminate layer falls away from the data component due to adhesive assembly liner separation and the bottom side of the substrate and data receives the prescribed interference coating or liner whereby the bottom layer of laminate is easily removed without disturbing artwork or data. It may still further provide the card issuer with the thinnest data component available that utilizes the same substrate material as the card unit and that the data component is initially protected by a plane on each side (2 layers, one on top and one on bottom of substrate). It is also contemplated that it may provide that the encapsulated adhesive (that will subsequently bond the data element to a secondary use such as a customer application form) will be protected from environmental exposure much more than the prior art.

It may also provide that the surface of the data and data-side substrate is protected from damage, contamination, tampering, and other degradation means until the second protective plane is removed without substrate or data degradation (due to the interference embodiment) so that the user is able to apply a data element that enjoys all the benefits described above and yet is ⅓ the thickness of the known art that begins with three layers and remains three layers. In this embodiment, invention 10 may begin with the multiple layers described above and protects the data element until the immediate point of secondary use for transferring the card unit's identity.

In another embodiment of the above, an indicia of any type (logos, text, graphics, symbols, instructions, warnings, opaque scratch-off areas, tamper evident indicators and other security, and marketing enhancements mentioned above), printed or applied by any means, can be applied to the protective plane adjacent to the removable card component's data and possible interference layer, providing indication of use (tamper evident), advertising, and other useful applications. Such indicia can be applied to either the substrate before data, the substrate and data, the substrate without data, between the substrate and possible interference coating or liner, on top of the interference layer but underneath the adjacent protective plane, on top of the interference layer with no adjacent protective layer, to the underside of the adjacent protective plane such as to the adhesive surface on the underside of laminating film, or on top of the outer surface of laminating film. Such indicia may serve to enhance the card product in many ways.

A further preferred embodiment may include an approach to die cutting through the layered material assembly as described above where the type and depth of cutting is unique to this application. This enhancement involves cutting the removable data component (that is intended to transfer the card unit's identity to a secondary use) with a different cutting depth than the rest of the card unit. The cutting depth may be adjusted to cut more shallow than the depth and pressure required to cut the rest of the card unit, in either a single cut or multi-step cutting process. The cutting depth for the removable data component is reduced so that as the cutting blade or shear mechanism advances onto the layered material assembly, from the top side toward the bottom side of the substrate that contains the data of the removable data element, the cutting mechanism passes through the top plane of protective material, then through the substrate and does not cut into the second bottom plane of protective material or laminate. To accommodate cutting sharpness variation and material thickness variation, invention 10 may include that the cutting depth (or blade height) is able to cut the top plane, the substrate and just partially begin cutting into the second protective plane closest to the coating but not cutting the second plane to its opposing surface. In a two-sided laminated card unit example like those above, the laminate closest to the removable data component's data would be "kissed" but not pierced. It is contemplated that this may provide the following benefits.

The data element can be removed from the top side, and due to the interference layer (coating or liner, though not required), and due to the partial kiss cut of the opposing bottom side plane, the bottom side plane remains attached to the rest of the card unit assembly. This enhancement automatically removes the unneeded protective plane over the data and substrate and saves the user time and scrap disposal. When the data element is removed, the top plane attached to the top liner of the adhesive assembly peels away and the resulting data component is ready for application to secondary uses.

The direction of die cutting in this embodiment can be reversed. A bi-directional die cutting process (coming into the layered material assembly from each direction with two cutting planes is also claimed. There are multiple adjustments to cutting machinery, die cutting blades and hardware, and assembly of the layered components that can achieve similar results incorporated in this embodiment.

An enhancement that can be applied to any of the above embodiments or be used separately is to use the adhesive assembly's multiple layers, with more or less layers and liners utilized than described above, to create a co-planer product that uses the layers and the ability for one or more layers to be separated easily and possibly affixed to other objects, where the separation of layers reveals information that was obscured prior to layer separation (e.g. a game or contest piece or security item), the separation of layers allows partially (kiss) cut components to be removed from the assembly and possibly affixed elsewhere (e.g. a calendar, a set of reminder tabs for placement in a personal calendar, letters of the alphabet, names, logos, sports teams, symbols, text, graphics, etc.), allows fully cut items to be removed, and/or the removed items are covered by a protective plane such as plastic laminate on one or both sides, possibly using adhesive on the other side of the removed component. Included also is the use of removable layers via a removable liner assembly or interference coatings or liners where the inner substrate is opaque or transparent and the outer layers can present a see-through assembly of paper or plastic layers, with possible indicia as described above revealed in the inside layer.

Once again referring to the illustrations generally and FIG. 3 in more particular, it is contemplated that the die cut components 14 may be cut by different means so as to produce different items for different uses. It is understood in the industry how to cut card unit 30 such that card 16, key fobs 18 and 20, and other end use products from card unit 30 may be achieved such that the protective layers are obtained on both sides when desired. The current invention 10 may include a method of making a cut wherein one or more removable data components may be produced such that it is selectively removable, but yet firmly attached for transportation, shipping, processing and so forth.

The current invention may use a "kiss" cut wherein the term is used for illustrative purposes and is not intended to limit the scope or detail. A kiss die cutting method may create a removable data component or components that will be removed from card unit 30 and used to transfer card unit 30 identity to a secondary use. As generally depicted and with the understanding that variation may be contemplated as discussed, adhesives 44 and 46 may not be required if the protective plane or planes can be bonded with substrate 36 without an adhesive layer.

Substrate 36 may have received standard printing on its surface prior to the process of receiving the upper or lower layers and data 38 may be fixed or variable data, that when applied to the material area for a removable component, create a removable data component with data 38 on the opposite side of substrate 36 as the remaining adhesive layer from the adhesive assembly. When removed in a thin form, the removable data component that will transfer card unit 30 identity may be constructed as generally depicted with variation depending on if element 50, element 56, and/or both are used as double sided tape, material with an applied adhesive layer, interference layer, and so forth. Element 56 may be an interference liner over the data but not bonded to the data or substrate 36 in any way. Alternatively, element 56 may have a coating that renders the surface of the data and substrate 30 within an applied area unable to be laminated.

Arrow 58 is generally provided to indicate a cutting edge for any cutting device or tool, possibly steel rule or hard tool construction, where its application by force creates a cut seam in materials and layers of materials and its general direction of travel through the various layers of materials forming card unit 30. It is understood that die cutting is known in the art. Dotted lines 60 and 62 generally represent an intention to cut through the various materials and may assure that the die cut path for any removable data component that must transfer card unit 30 identity will receive adequate adhesive assembly so that it may be affixed for a secondary use and cut through element 50 and, when provided, element 56 as well which may include adhesive 46 and partially through second protective plane 34 where data 38 and the desired removable data component properties are met.

Cutting depth 64 generally indicates a full cut through material such as would be desired for but not limited to die cut components 14 card 16 and key fob or fobs 18 and 20 through the material or card unit 30 which is known in the industry. Kiss cutting depth 66 generally indicates the die cutting depth by cutting device 58 where area 68 may be the intended depth where the cutting device, moving from top to bottom, stops any further cutting pressure upon the material assembly.

It is understood that many embodiments may utilize different depths of cut depending on the use of more than one element 50, the layering components utilized and so forth. Furthermore, it is understood that the direction of cutting may be reversed such that the cut is from the bottom and the illustrations and examples regarding direction are for illustrative purposes and should not be considered to limit the invention as such. It is contemplated that the cut is on all sides for the removable data component while the second protective plane 34 is not cut completely or at all. This kiss cut approach allows the customer to relatively easily remove second protective plane or layer 34, thereby exposing substrate 36 with data 38 (removable data component) which may be pealed from its contact with first protective layer 32. Lift tab 70 may be provided for an easier peel and or removal from card unit 30.

It is understood that wherein the construction has element 50 (and not element 56 also), and element 50 is a double sided tape, the element 50 top 52 would be removably stuck or in contact with first protective plane or layer 32 and could be reapplied to another desire surface, such as a form or application. Hence, the bottom 54 of element 50 may be still attached as desired to substrate 36. As previously mentioned, element 50 may be of a tape with both reusable sticky surfaces, or such that the side in contact with substrate 36 may be of a more permanent nature, and likewise the substrate could be composed of material that would make the bonding of the tape more relatively fixed, and so forth.

It is further contemplated that the cut may allow element 50 to be removed, but not cut such that element 56 is readily removable. This may allow data to be transferred with element 50 to a second location and yet allow element 56 stay with carrier 12. It is also contemplated that the removed data component, due to this cut, is comprised then of layers where the customer peels away a layers, such as an interference layer, leaving a usable identity transfer component.

Figure 25:
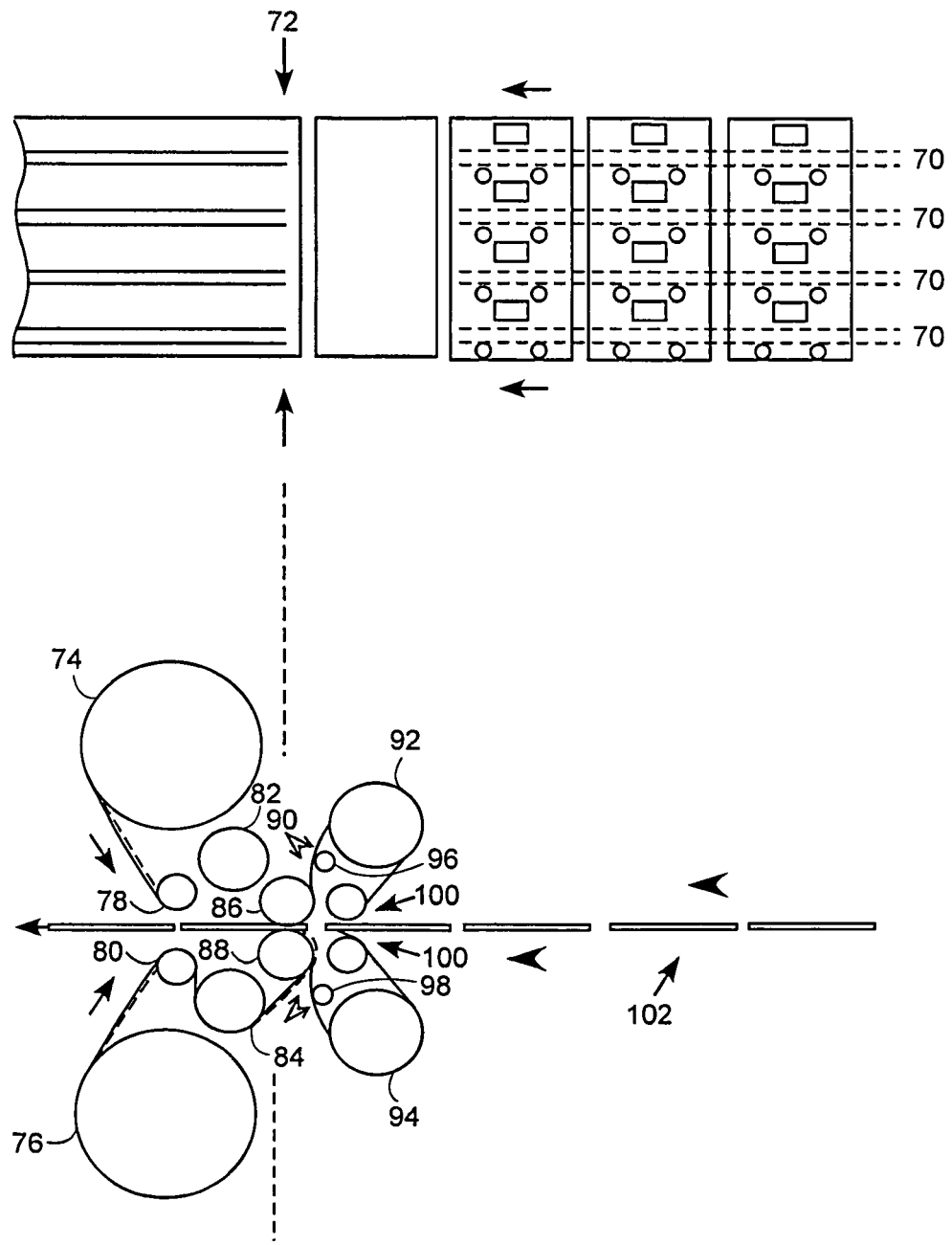
FIG. 25 is a general schematic of a preferred embodiment of the invention.

Once again referring to the drawings and more in specific to FIG. 25, in accordance with a preferred embodiment of invention, a lamination process from above where the sheet of multiple card units and the area 71 on each designated for the adhesive assembly with the sheets advancing toward the lamination assembly point 72 is generally depicted. It is contemplated that a web printed continuous roll of multiple printed card units could be used instead of multiple sheets of the same. At the lamination assembly point 72, the protective plane and adhesive assembly may be applied to the substrate on the top, and the protective plane and interference liner or element is applied to the substrate on the bottom, in this example. Lamination assembly point 72 generally represents the point where the adhesive assembly and possibly the interference liner have been applied to both the top and bottom laminates and all layers have been bonded to create a finished assembly ready for die cutting, represented by the top of the illustration of FIG. 25.

Figure 24:
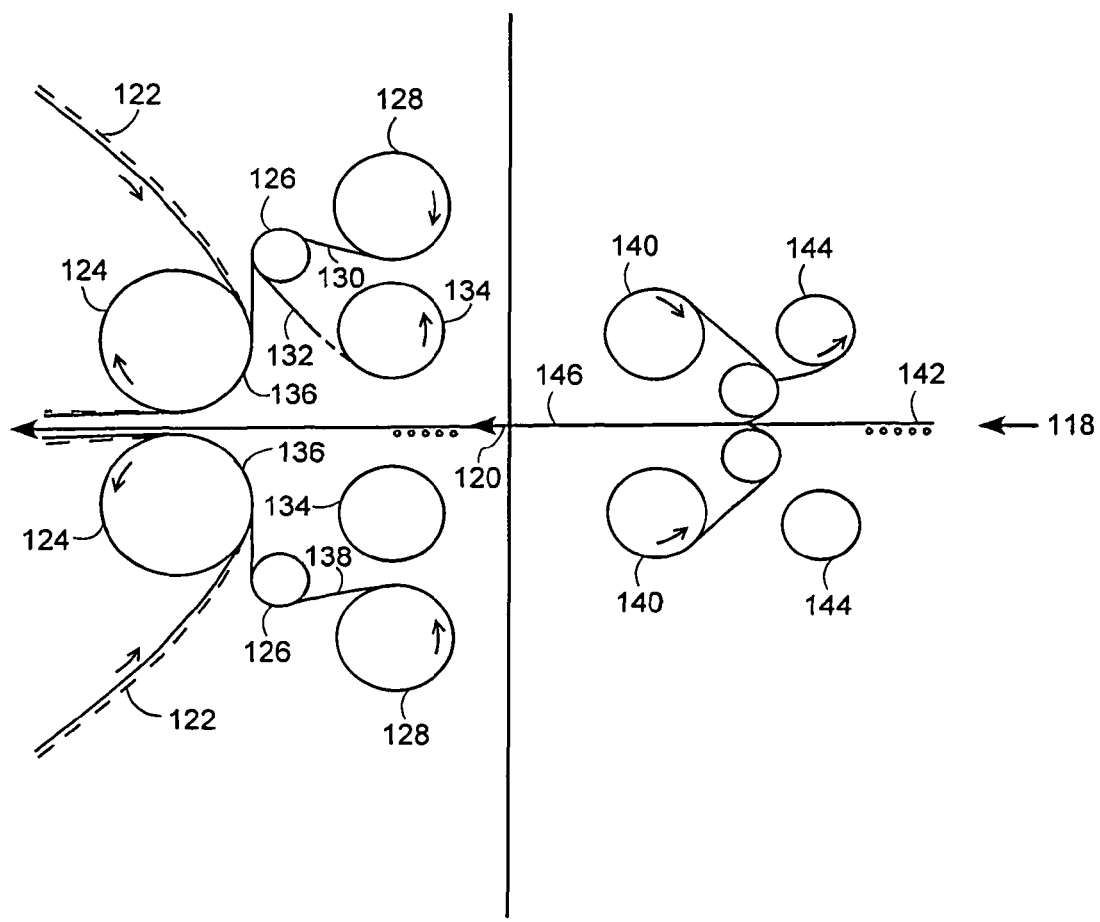
FIG. 24 is a general schematic of a preferred embodiment of the invention.

The bottom portion of FIG. 25 generally shows the conventional application process that will accomplish the above wherein a roll of protective plane 74, usually plastic where the dotted surface of the material emitted from each roll 74 represents the adhesive resin. In this example, roll 74 may be a polyester PET laminate. Rolls are not required to accomplish this overall assembly—sheets of laminatable plastic will suffice. Tension roller 78 and or 80 may be used for the laminate, pre-heat roller 82 and 84 may activate the laminate's adhesive resin, making it "wet", and nip roller 86 may continue to heat the laminated as it is pressed onto the substrate with pressure from opposing roller 88. Point 90 describes the preferred approach to applying the adhesive assembly to the laminate just prior to lamination where a roll 92 of adhesive assembly with all liners intact is unrolled and passed over a steering roller 96 that may adjust the assembly's position on the laminate. Approach 100 is a secondary method of unrolling roll 94 (or 96 respectively) of adhesive assembly and applying the assembly to the substrate's surface before lamination. Adhesive assembly can be applied to substrate rolls or sheets in a two-step process that is separate from lamination. In either approach, it is understood that the process of removing the adhesive assembly's bottom liner may not be shown but may be required to expose the adhesive to the substrate for bonding. FIG. 24 demonstrates liner removal and adhesive application in detail. Arrow 103 designates the viewable plane for the data within the removable data component that will transfer a card unit's identity.

Figure 22:
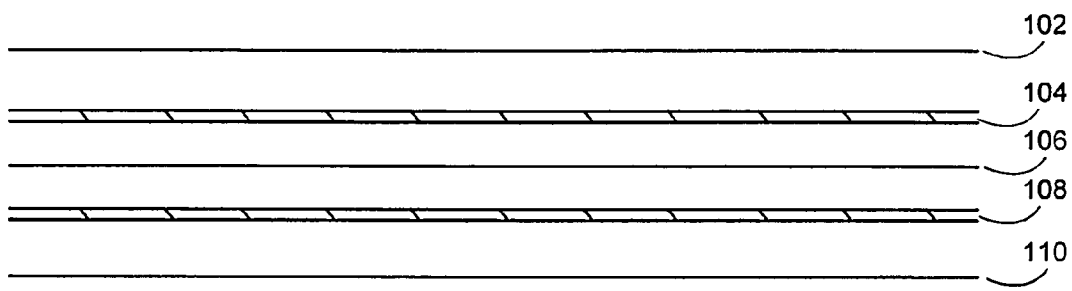
FIG. 22 is a partially exploded side view of a preferred embodiment of the invention.

Again referring to the drawings, FIG. 22 generally depicts a 5-layer adhesive assembly with a preferred construction where layer 102 may be a removable paper or plastic liner, either opaque white, printed (with instructions, warnings, security features, marketing features, etc.), colored, or transparent. Layer 104 may be either temporary or permanent adhesive that when pressed against another surface, forms a bond. Layer 106 may be the center liner, providing the inner assembly additional strength, preferably transparent but possibly opaque white or colored. Layer 108 may be either temporary or permanent adhesive that when pressed against another surface, forms a bond. Layers 104, 106, and 108 may form the inner adhesive assembly that may remain together and adjacent to the substrate after all liners are removed. Layer 110 may be a removable paper or plastic liner, either opaque white, printed (with instructions, warnings, security features, marketing features, etc.), colored, or transparent. Layer 110 may be removed just prior to applying the adhesive assembly adjacent to the substrate so that layer 108 is exposed for application and bonding to the substrate.

Figure 23:
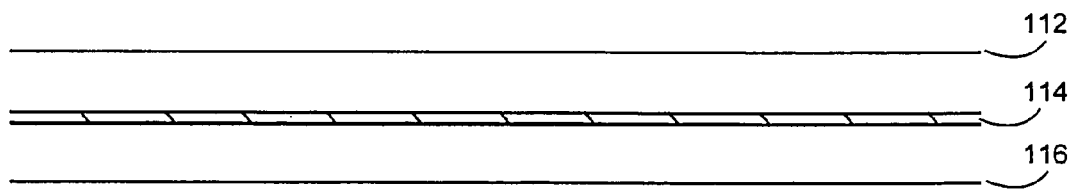
FIG. 23 is a partially exploded side view of a preferred embodiment of the invention.

Again referring to the drawings, FIG. 23 generally describes a 3-layer assembly where layer 112 may be a removable paper or plastic liner, either opaque white, printed (with instructions, warnings, security features, marketing features, etc.), colored, or transparent. Layer 114 may be either temporary or permanent clear or opaque adhesive that when pressed against another surface, forms a bond. Layer 116 may be a removable paper or plastic liner, either opaque white, printed (with instructions, warnings, security features, marketing features, etc.), colored, or transparent. Layer 116 may be removed just prior to applying the adhesive assembly adjacent to the substrate so that layer 114 is exposed for application and bonding to the substrate.

It is contemplated to include a radio frequency "RF" component or components, on one of the layers described or similar construction, where the act of application and cutting options are available to create an RF data component that can be removed or remain intact in the card unit's components or matrix. Alternatives to an RF component can include, a chip, antenna, wire, battery, circuit, switch, and other technologies where the application of these technologies is assisted by the method described herein via a transport adhesive assembly, liner assembly, multi-layered removable assembly, or fully encapsulated permanent assembly where the benefit of encapsulating such technologies on a roll of liner material is helpful in the encapsulation and manufacturing process for the overall card sheet and card unit. In a case where the embedded technology is uniquely identifiable (e.g. RF identifier), the roll of technology components can be formed with a readable reference code (e.g. barcode) adjacent next to each unique component so that the specific area of tape/liner being applied can be recorded and the material receiving this specific section of tape/liner with technology components can be subsequently imaged, processed, catalogued, sorted, etc. by using the same reference information. For example, in a 3.375" credit card-sized section of multi-layered adhesive/liner, a radio frequency device has been pre-affixed with it's corresponding bar code reference printed on the outside of its liner. The liner is peeled away at the application point, the liner is scanned and further variable data printing occurs to the substrate or finished layered card product so that it matches the RF contents now embedded in the product.

FIG. 24 generally describes two approaches to constructing the removable component via a multi-layered adhesive assembly and possibly interference liner. Line 118 represents printed substrate material, either in sheet for roll form, moving toward the lamination process. Line 120 presents fixed or variable data for the removable data component that will transfer the card unit's identify to a secondary use.

Left portion of FIG. 24 generally depicts the application of top adhesive assembly to the protective planes 122 where the dotted surface of the protective planes represents the adhesive that may normally bonds the plane with the substrate. For either top or bottom, the material advances toward lamination roller 124 whereby it is pressed onto the substrate with heat and pressure, possibly guided by a secondary roll 126.

For top application, roll 128 of adhesive assembly 130 is unrolled and guided into the appropriate position for application to protective plane (e.g. laminating film) 122. Before adhesive assembly 130 is applied to lamination surface, the underside liner 132 of the adhesive assembly is peeled away and re-rolled as waste on roll 134. Application point 136 or contact point of the remaining adhesive assembly may be put onto the activated laminate adjacent to the roller 124. Roller 124 could represent a nip roller, pre-heat roller or any other stable surface suitable for applying the adhesive assembly.

For the bottom assembly, if an interference liner is used adjacent to data/substrate surface, the same approach is used. Roll 128 of single or multiple layer liner 138 is unrolled and guided into the appropriate position for application to protective plane (e.g. laminating film) 122. If any layer of liner 138 must be removed prior to application point 136, roll 134 is available for winding this waste.

The right side of FIG. 24 generally depicts a similar approach but toward applying adhesive assembly or interference liner directly to the substrate sheet or roll prior to receiving any other protective planer material and forming a bonded card sheet. Roll 140 of single or multiple layer adhesive/liner is unrolled and guided into the appropriate position for application substrate 142. If any layer of liner must be removed prior to application point, roll 144 is available for winding this waste. Point 146 represents the substrate with desired upper or lower liner assemblies applied, moving toward lamination process, for example.

It is contemplated that card unit 30 may be constructed such that air pockets or cavities are created in the die cut components 14 such as card 16 or key fobs 18 and 20. The creation of a card product that contains enough air pockets may allow the these components to float as a opposed to sinking. Furthermore, it is contemplated that card unit 30 may be fitted for chips or other technology for receiving or transmitting data. Elements 50 and or 56 could include chip technology along with substrate 36.

Of note, the invention is not necessarily directed strictly to transactional cards and that the terms, words, and/or title referring to uniquely coded transactional card should not be considered limiting. Likewise, the current invention is not limited to traditional cards and system known in the art. It is further understood and contemplated that the current invention may be used in association with items such as but not limited to sets of uniquely encoded transaction cards and devices, tags, labels, mailers, and other sheet elements. Still furthermore, other data imaging and reading methods may be contemplated other than magnetic, scanners, bar coding, or the like. Changes may be made in the combinations, operations, and arrangements of the various parts and elements described herein without departing from the spirit and scope of the invention.

I claim:

1. A transactional card system comprising:
   a carrier having a top plastic layer and a bottom plastic layer;
   at least one removable die cut card having a unique identifier wherein said at least one card is removably attached to said carrier; and
   at least one removable die cut data component removably attached to said carrier wherein said data component comprises:
   a) a substrate having a top and a bottom with a corresponding identifier to said at least one card on said top of said substrate;
   b) a first removable die cut protective layer over said top of said substrate integrally formed from said bottom plastic layer of said carrier;
   c) an adhesive element having a top and a bottom wherein said top is attached to said bottom of said substrate for allowing said removable data element to be re attached to another surface; and
   d) a second protective layer over said bottom of said adhesive element integrally formed from said top plastic layer of said carrier.

2. The transactional card system of claim 1 further comprising at least one die cut key fob removably attached to said carrier wherein said key fob includes a corresponding identifier to said at least one card and said at least one removable die cut data component.

3. The transactional card system of claim 1 wherein said at least one removable die cut card further includes a magnetic stripe.

4. The transactional card system of claim 1 wherein said at least one removable die cut data component further includes a lift tab for assisting in the removal of said at least one removable die cut data component from said carrier.

* * * * *